(12) United States Patent
Rebick

(10) Patent No.: US 11,007,832 B1
(45) Date of Patent: May 18, 2021

(54) HITCH MOUNT ASSEMBLY

(71) Applicant: Michael S Rebick, Little Rock, AR (US)

(72) Inventor: Michael S Rebick, Little Rock, AR (US)

( * ) Notice: Subject to any disclaimer, the term of this patent is extended or adjusted under 35 U.S.C. 154(b) by 0 days.

(21) Appl. No.: 16/597,127

(22) Filed: Oct. 9, 2019

Related U.S. Application Data

(63) Continuation of application No. 29/708,107, filed on Oct. 3, 2019, now Pat. No. Des. 881,078.

(51) Int. Cl.
  *B60D 1/52* (2006.01)
  *B60R 3/00* (2006.01)

(52) U.S. Cl.
  CPC ............... *B60D 1/52* (2013.01); *B60R 3/007* (2013.01)

(58) Field of Classification Search
  CPC .. B60D 1/58; B60D 1/52; B60R 3/007; B60R 11/00
  See application file for complete search history.

(56) References Cited

U.S. PATENT DOCUMENTS

| | | | |
|---|---|---|---|
| 5,458,305 A | 10/1995 | Woodward | |
| 6,474,522 B1 | 11/2002 | Johnson | |
| 6,502,845 B1 * | 1/2003 | Van Vleet | B60D 1/155 280/491.1 |
| 6,769,704 B2 | 8/2004 | Cipolla | |
| 7,114,736 B2 | 10/2006 | Stodala et al. | |
| 7,185,904 B1 | 3/2007 | Jones et al. | |
| 7,338,064 B1 | 3/2008 | Williams | |
| 7,784,813 B2 * | 8/2010 | Columbia | B60D 1/06 280/511 |
| 8,322,739 B1 | 12/2012 | Fair et al. | |
| 8,727,364 B2 | 5/2014 | Masanek et al. | |
| 8,915,514 B2 * | 12/2014 | Columbia | B60D 1/52 280/511 |
| 8,960,512 B2 * | 2/2015 | Maenle | A01B 23/02 224/410 |
| 9,676,318 B2 * | 6/2017 | Langenfeld | B60P 3/1075 |

(Continued)

OTHER PUBLICATIONS

RV.net Open Roads Forum; https://www.rv.net/forum/index.cfm/fuseaction/thread/tid/27708080.cfm ;last visited May 30, 2019.

(Continued)

*Primary Examiner* — Ruth Ilan
*Assistant Examiner* — Michael R Stabley
(74) *Attorney, Agent, or Firm* — Rashauna Norment

(57) ABSTRACT

A hitch mount assembly supports, transports, and stores one or more of a plurality of attachment members and accessories about a mounting surface or frame of a vehicle, a trailer, or a watercraft trailer without using an existing hitch receiver. The hitch mount assembly comprises at least one mounting bracket having at least one base tube having opposing open ends, two mounting plates defining a plurality of bores, and a plurality of fasteners for securing the two mounting plates to the frame; a plurality of attachment members selectively arranged about the base tube forming a kit; and a plurality of hitch pins for securing the components of the hitch mount assembly. The components of the hitch mount assembly may be configured into a variety of ways to form one or more hitch mounting kits that supports, transports, and/or stores accessories.

18 Claims, 33 Drawing Sheets

(56) References Cited

U.S. PATENT DOCUMENTS

| | | | |
|---|---|---|---|
| 9,707,811 B2 * | 7/2017 | Columbia | B60D 1/07 |
| 9,783,016 B2 * | 10/2017 | Forhan | B60D 1/58 |
| 2006/0214391 A1 | 9/2006 | Columbia | |
| 2007/0252360 A1 | 11/2007 | Wooten | |
| 2008/0011698 A1 | 1/2008 | Simon | |
| 2008/0168929 A1 | 7/2008 | Thompson | |
| 2012/0049484 A1 * | 3/2012 | Brass | B60D 1/60 280/507 |
| 2016/0288726 A1 | 10/2016 | Endrasik | |

OTHER PUBLICATIONS

Amazon.com Quick Products QPRBAB Deluxe RV Bumper Receiver; https://www.amazon.com/Quick-Products-QPRBAB-Adapter-Mounting/dp/B013U6NGGK%3FSubscriptionId%3DAKIAI2QLKINDTX3PNE3TQ%26tag%E2%80%A6 ; last visited May 30, 2019.

* cited by examiner

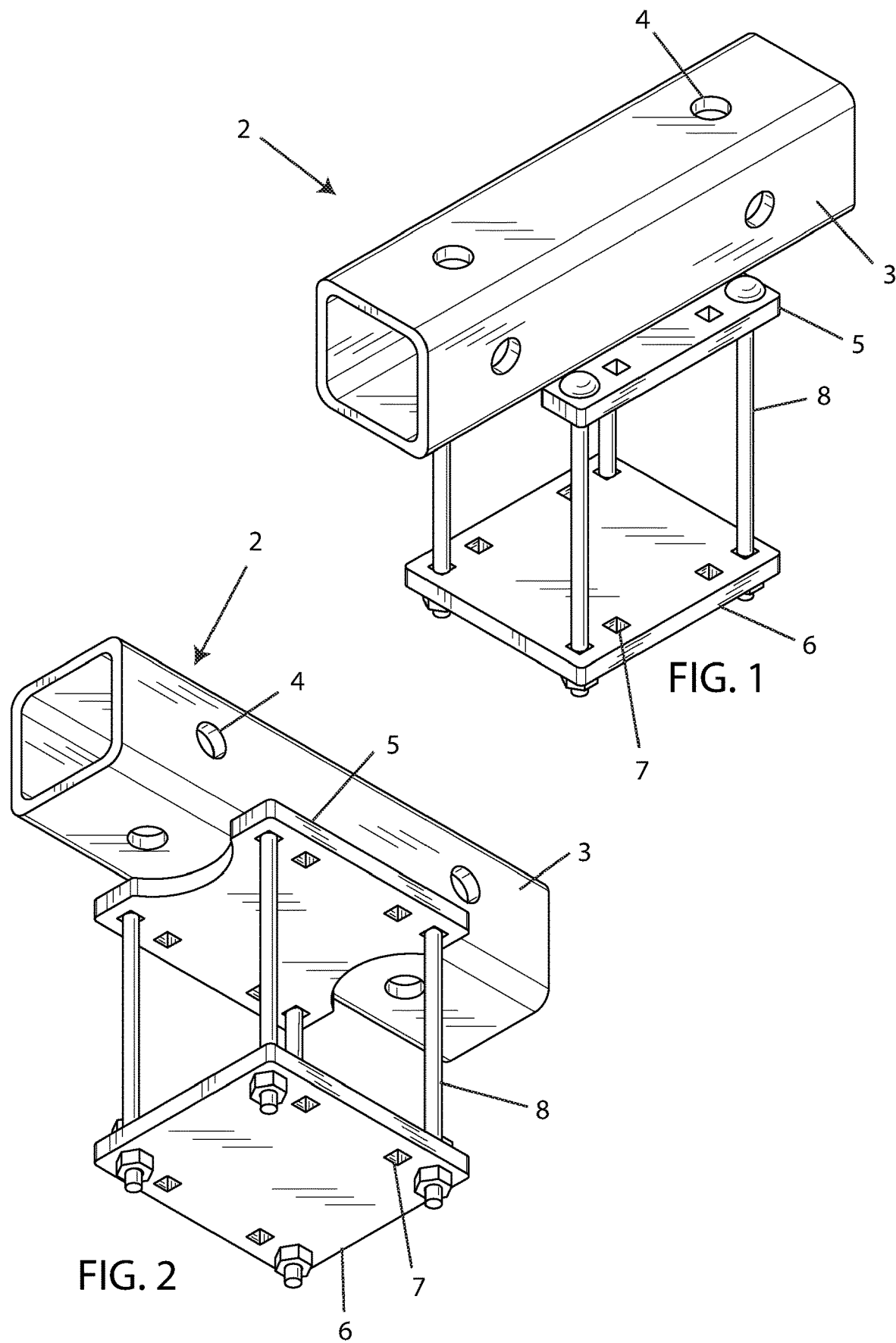

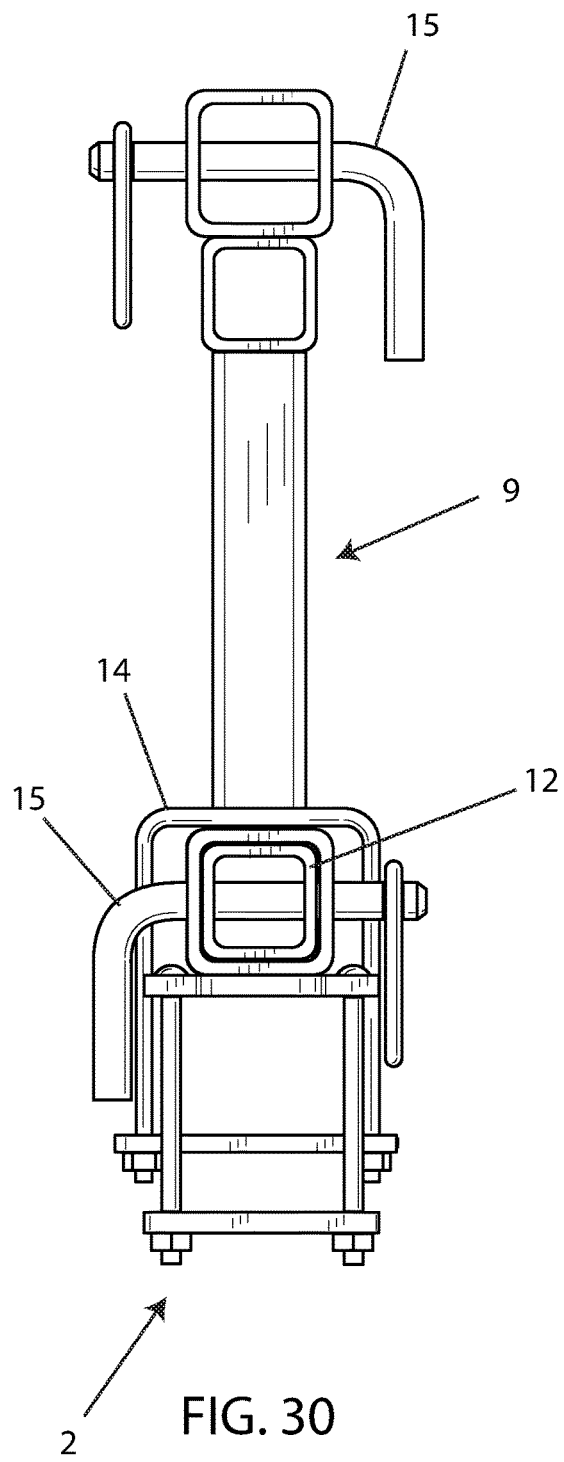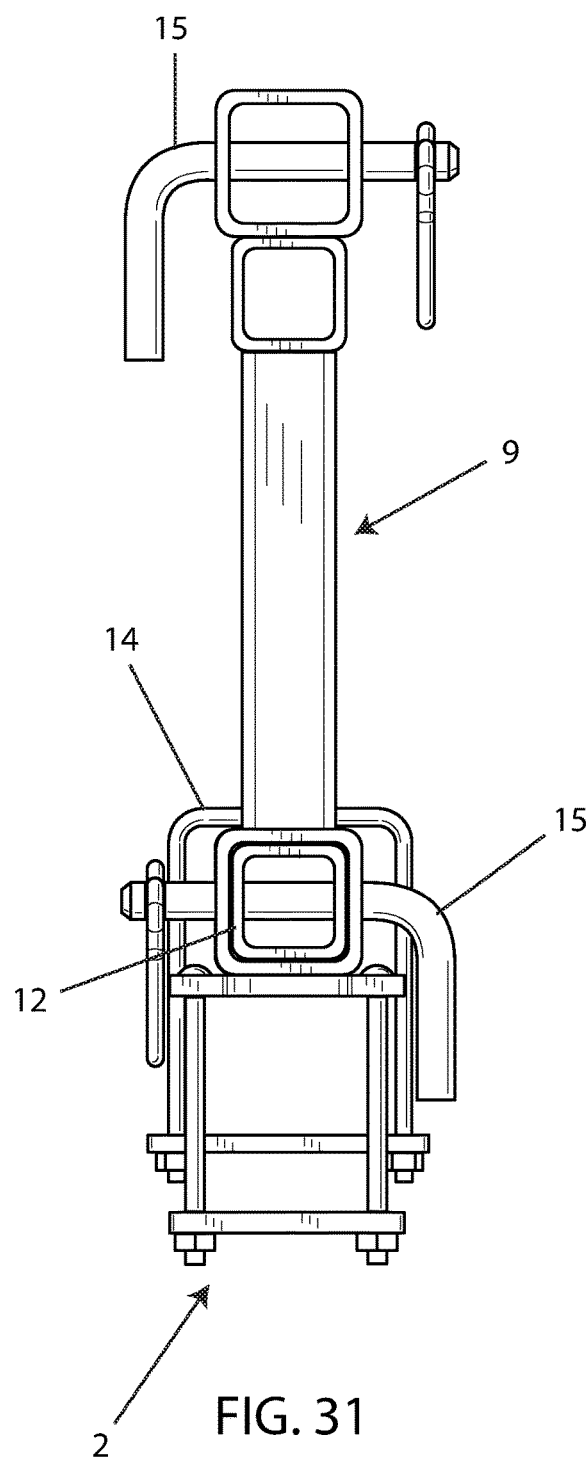
FIG. 30                 FIG. 31

HITCH MOUNT ASSEMBLY

CROSS-REFERENCE TO RELATED APPLICATIONS

This application is a continuation of pending U.S. Design patent application Ser. No. 29/708,107, filed Oct. 3, 2019, and claims the benefit and priority of said design patent application, which is incorporated herein by reference.

FEDERALLY SPONSORED RESEARCH AND DEVELOPMENT

Not applicable.

BACKGROUND OF THE INVENTION

1. Field of the Invention

The present invention generally relates to a hitch mount assembly comprising a base mounting tube having opposing open ends adapted to support more than one attachment member or accessory without using an existing hitch receiver, and a plurality of attachment members for selectively configuring one or more kits for storing and/or transporting one or more accessories on the frame of a trailer, vehicle, watercraft trailer, or other mountable structure.

2. Description of Arguably Related Art Including Information Disclosed for 37 CFR 1.97 and 1.98

Boat trailers, utility trailers, enclosed trailers, and many other types of trailers do not come outfitted with a way to carry multiple hitch mounted accessories and attachments. Furthermore, most vehicles and trailers do not come equipped with more than one hitch receiver. Currently, there are several hitch mounted attachment members available that can couple to the existing receiver hitch. When a vehicle's receiver hitch is occupied by a trailer hitch, the trailer hitch must be removed before other attachment members or accessories can be coupled to the vehicle's receiver hitch. Also, multiple attachment members and accessories cannot be coupled to the receiver hitch due to the structure of the existing receiver hitch. Currently, there is no effective trailer mounted receiver available to allow the mounting of the hitch mounted accessories to the trailer for storage and transport purposes.

A problem with conventional hitch mount assemblies that have a mounting tube affixed to a single mounting plate, with the mounting plate being secured to the frame (or mounting structure) of the trailer or vehicle with U-bolt fasteners, is that using U-bolt fasteners allow excessive wobbling of the assembly.

Yet another problem with the configuration of conventional mounting plates is that the location and number of bores for receiving a fastener limits the user to a particular frame size; and that the structure of these mounting plates do not allow a user to use a hitch pin or other locking member through the top of a mounting tube.

Another problem with conventional hitch mount assemblies is that the mounting (receiver) tube has only one open end. Thus, these types of mounting tubes cannot support an attachment member or accessory being coupled at either end of the mounting tubes.

The frame or mounting structure of the vehicle, watercraft trailer, or trailer refers to any beams, frames, bumpers, or structural locations capable of supporting a hitch mount assembly. Bumpers includes, but is not limited to, vehicle bumpers, RV bumpers, cargo trailer bumpers, truck bumpers. Many of these hitch mount assemblies are constructed from solid steel.

U.S. Pat. No. 6,474,522 issued to Johnson discloses a receiver bracket (mounting tube) for mounting to a square or rectangular bumper of a recreational or similar vehicle. The receiver bracket is designed to accept various racks or other accessories of limited weight, with a maximum of about 200 pounds. The receiver bracket is symmetrical, allowing mounting of a square mounting tube either below or above the supporting bumper in a horizontal orientation. Alternatively, the receiving bracket can be mounted to the bumper with the square tubing in a vertical orientation.

U.S. Pat. No. 8,322,739 issued to Fair et al. discloses a boat trailer steps that includes a first and second support arm in pivotal relation to one another which provide steps that assist a user in entering or exiting a boat when trailered or in the process of being trailered. The support arms are arranged at an angle relative to the trailer tongue. When not in use, the second support arm pivots downward for compact stowage. When deployed, the support arms are in alignment with one another. A grab handle may be provided to assist the user in climbing or descending the steps.

U.S. Patent Application No. 2009/0120976 filed by Charles J. MacKarvich discloses a pivotal spare tire carrier is mounted to a side frame segment of a boat trailer. The proximal end of the support arm is pivotally attached to the trailer frame on the outside surface thereof and tilts the tire from between mount and dismount positions outside the trailer frame and a travel position inside the trailer frame. When the tire is in its travel position, it is tilted approximately parallel to the facing surface of the hull of the boat.

None of these patent references disclose a hitch mount assembly comprising at least one mounting bracket having two mounting plates and at least one base tube affixed to one of the mounting plates, with the base tube defining opposing open ends wherein each opposing open end can receive a selectively arranged plurality of attachment members forming a kit; and a plurality of hitch pins that secures each of the plurality of attachment members to a mounting member; wherein the hitch mount assembly is mountable to a frame independent from an existing hitch receiver. None of these patent references teach, disclose, or suggest the claimed kits or assembly of components and configurations for use with the apparatus.

A need exists for a hitch mount assembly comprising (a) a mounting bracket having 1) a base mounting tube with opposing open ends and 2) at least two mounting brackets, wherein the mounting brackets can be installed at any location on a frame of a vehicle, a trailer, a watercraft trailer, or other mounting structure; and (b) a plurality of attachment members, wherein one or more of a plurality of attachment members can be coupled to one or both open ends of the base tube in a selective configuration, with one or more of the attachment members being further coupled to another attachment member or an accessory to form a kit, and wherein the plurality of attachment members may be selected from the group consisting of extenders, risers, steps, hand rails, tire carriers, and jack mounts.

A need exists for a hitch mount assembly that allows for quick and easy installation of lightweight components that have enough strength to support a plurality of attachments and accessories.

SUMMARY OF THE INVENTION

Due to the described disadvantages inherent in the known types of hitch mount assemblies, the present invention provides a new and improved methods for attaching one more accessories and attachment members to trailers, vehicles, and recreational vehicles without using the mounting structures hitch receiver. It is understood that the present invention is not limited in its application to the details of construction and to the arrangement of the components described in the following illustrated drawing or in the detailed description.

This invention provides a simple, easy, and cost-effective way to use a hitch mount assembly with a mounting bracket having two mounting plates with a plurality of fasteners, and a base tube having opposing open ends with each opposing end for coupling to one of a plurality of attachment members or an accessory; and a plurality of hitch pins. The plurality of attachment members includes extenders, risers, steps, tire carriers, and jack mounts. Any combination and/or duplication of the attachment members may be used with the invention to form a customized kit for supporting, transporting, or storing at least accessories about the frame.

The hitch mount assembly is quickly mountable to a frame. The base tube accommodates the quick coupling and removal of up to two accessories or attachment members at a time, with one accessory or attachment member coupled at each end of the base tube. The user may position the mounting bracket at different places on the frame, with the base tube being oriented in the user's desired direction. The types of accessories that can be supported, transported, and/or stored with this hitch mount assembly on a frame include, but is not limited to, steps, bike racks, cargo carriers, spare tires, and other hitch-mounted accessories.

The hitch mount assembly essentially utilizes a plurality of mounting tubes that may be coupled to each other or to an accessory. The mounting tubes may be any combination of the following and are selected from the group consisting of the base tube (receiver mounting tube), one or more of a plurality of types of extenders, custom risers, and other mounting tubes that are affixed to other attachment members such as a step or a hand pole (handrail). The mounting tubes and mounting plates will accommodate swift mounting and removal of multiple hitch mounted accessories and attachment members using this customized hitch mount assembly. The mounting tubes of the hitch mount assembly are sized to cooperate with universal hitch mounts, custom designed brackets, and universal brackets. Using two base tubes allows for up to four independent couplings of the plurality of attachment members to the at least one base tube and a second base tube.

The mounting plates and fasteners of the mounting bracket may be easily removed to reposition or move the mounting bracket to another trailer or other frame mounting structure as needed. Multiple mounting brackets may be installed at a variety of locations on the frame or flooring, for example, rear mounting for stabilizer jacks and/or side mounting for jacks to lift a trailer for changing a tire. The accessories and attachment members may be quickly removed and repositioned to any frame mounting location via the mounting bracket(s) as needed by simply removing and re-inserting a hitch pin through a set of holes on the respective mounting tube and by removing and re-inserting the fasteners through the bores of the mounting plates.

The hitch mount assembly can be configured different ways, including, but not limited to, a watercraft trailer mount kit, a saddle step kit, and a boat stair kit. A saddle step kit includes a mounting bracket and one step. An example of the saddle step kit is shown in FIGS. 10-25, with the saddle step kit forming part of a boat stair kit.

A boat stair kit allows the user to install a customized arrangement of attachment members on a boat frame for easy access and exit of a boat that has been trailered. The boat stair kit includes a mounting bracket, at least two steps, a long L-extender, a short L-extender, a hand pole, four joint tighteners, and three hitch pins. In the embodiment shown in FIGS. 10-25, the boat step kit includes a mounting bracket, three steps, a hand pole, a riser, a long L-extender, and a short L-extender, and a plurality of hitch pins. Here, one step is part of a saddle step kit, and the other two steps each have an elongated mounting tube. In this embodiment, the steps are installed at staggering heights and orientations by utilizing the riser, the long L-extender, and the short L-extender. The mounting bracket may be removably mounted to the boat frame at any available location with the mounting plates, then fastening the carriage bolts through the appropriate bores of the two mounting plates. Each open end of the base tube is utilized in the boat stair kit. A proximal (first) open end of the base tube supports one of the L-extenders and a step. A distal (second) open end of the base tube supports another L-extender, a riser, a step, and a hand pole. The plurality of attachment members remains balanced about the base tube of the mounting bracket.

As shown in FIGS. 26-41, a watercraft trailer mount kit includes a mounting bracket, a double extender (alternatively, a coupler extender), a riser, a U-bolt pin, and a plurality of hitch pins. Here, only one open end of the base tube is utilized. The riser is inverted and couples to a coupler extender which is coupled to the base tube. The bottom (lower) mounting tube and the middle mounting tube of the riser are unencumbered but may further support other attachment members or accessories. Likewise, the unused open end of the base tube may further support other attachment members or accessories.

It is an object of the present invention to provide a hitch mount assembly comprising (a) a mounting bracket having a base mounting tube with opposing open ends; and two mounting brackets for installing at any location on a frame of a vehicle, a trailer, a watercraft trailer, or other mounting structure; and (b) a plurality of attachment members, wherein one or more of a plurality of attachment members can be coupled to one or both open ends of the base tube in a selective configuration, with one or more of the attachment members being further coupled to another attachment member or an accessory to form a kit, and wherein the plurality of attachment members may be selected from the group consisting of extenders, risers, steps, hand rails, tire carriers, and jack mounts.

It is an object of the present invention to provide a hitch mount assembly that allows for quick and easy installation of lightweight components that are strong enough to support a plurality of attachments and accessories.

These and other aspects, objects, embodiments, and advantages of the invention will become apparent from the accompanying drawing and the following detailed description of the preferred embodiments of the invention.

BRIEF DESCRIPTION OF THE SEVERAL VIEWS OF THE DRAWING

The invention may be more readily described by reference to the accompanying drawing figures and the following description of the drawing figures. The reference numbers apply to each embodiment of the invention. In the drawing:

FIG. 1 is a perspective view of an exploded view of the hitch mount assembly, showing a mounting bracket having a base tube, two mounting plates, and a plurality of fasteners, preferably carriage bolts, with the base tube being affixed to one of the mounting plates;

FIG. 2 is another perspective view of FIG. 1 thereof;
FIG. 30 is a front elevation view of FIG. 26 thereof;
FIG. 31 is a rear elevation view of FIG. 26 thereof.

Figure 3:
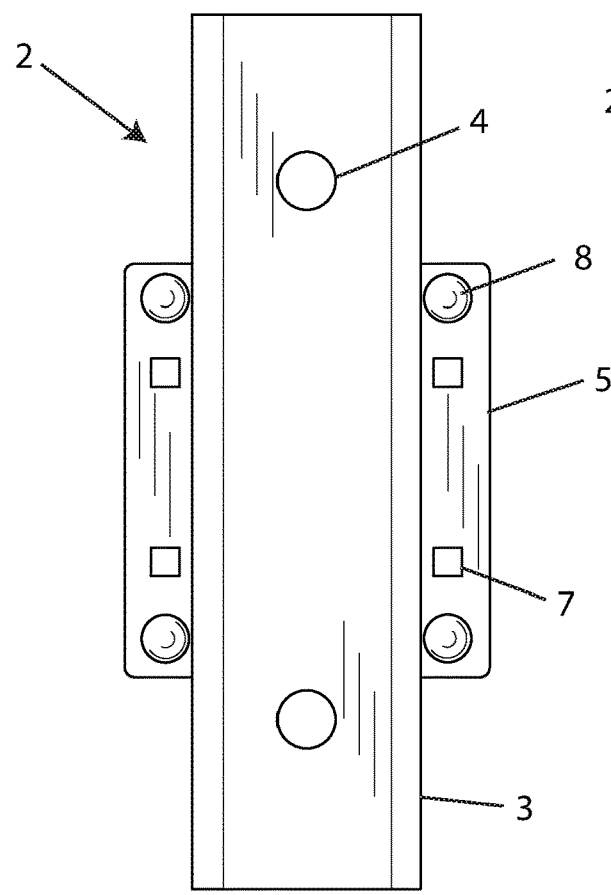
FIG. 3 is a top plan view of FIG. 1 thereof.
Figure 4:
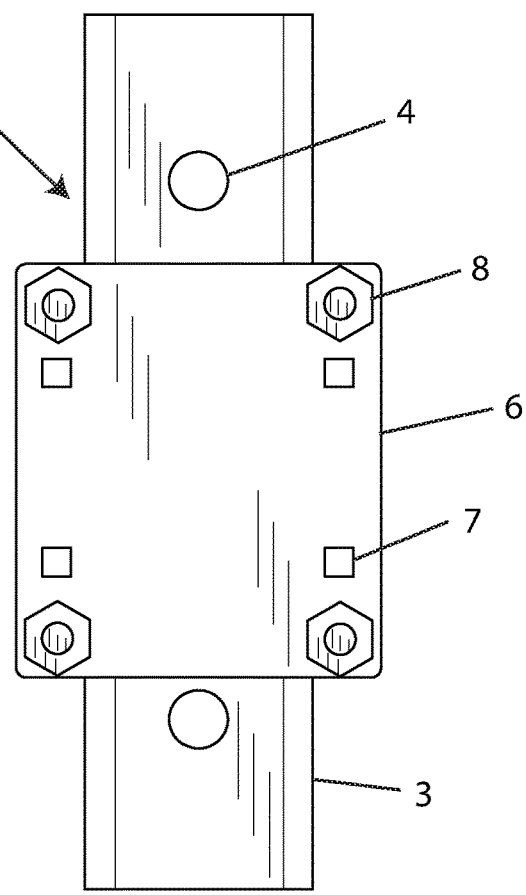
FIG. 4 is a bottom plan view of FIG. 1 thereof.
Figure 5:
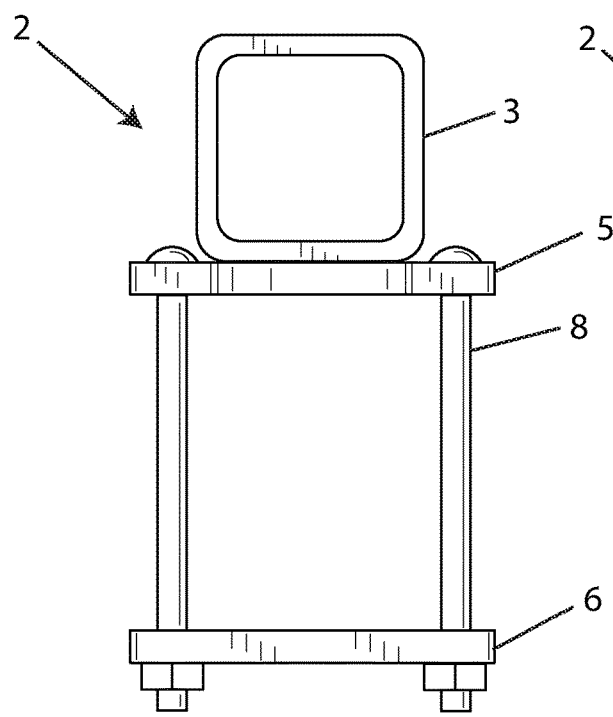
FIG. 5 is a front elevation view of FIG. 1 thereof.
Figure 6:
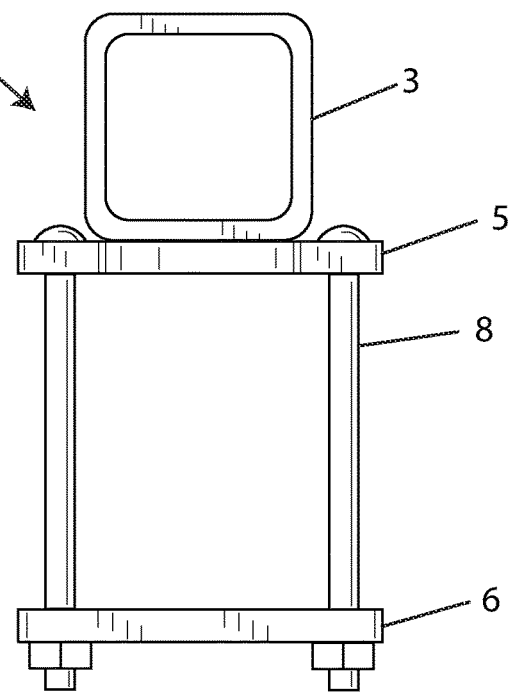
FIG. 6 is a rear elevation view of FIG. 1 thereof.
Figure 7:
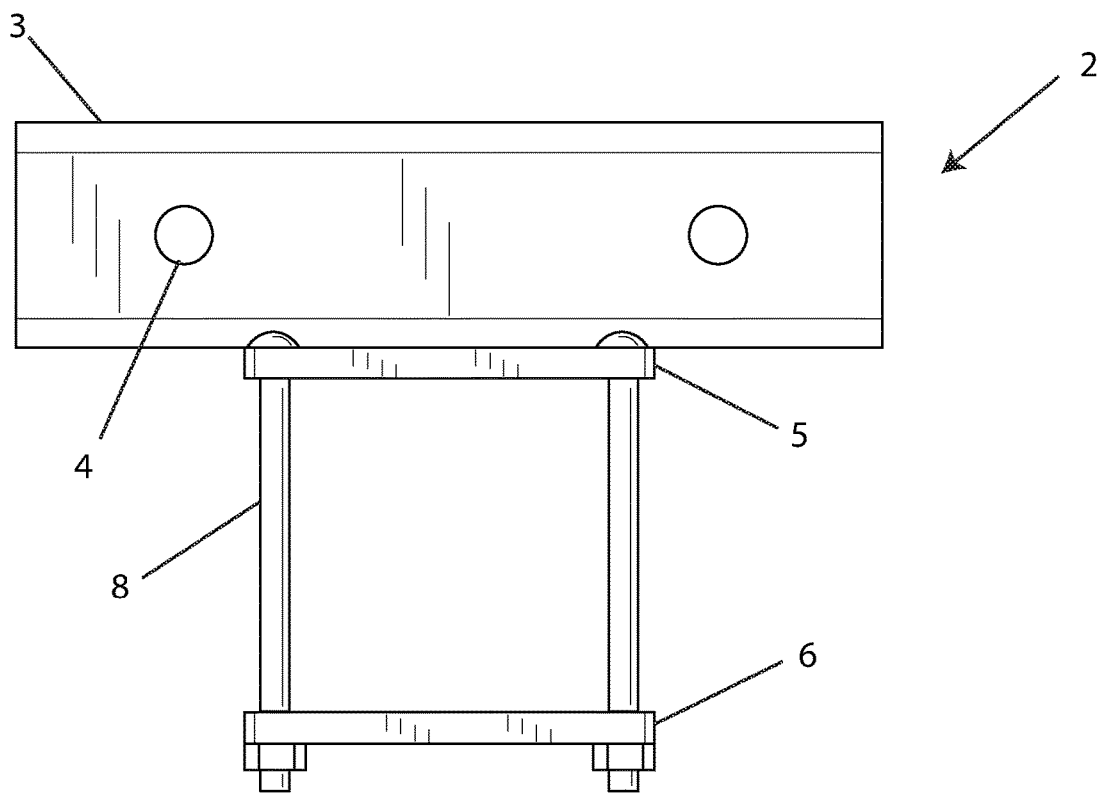
FIG. 7 is a left side elevation view of FIG. 1 thereof.
Figure 8:
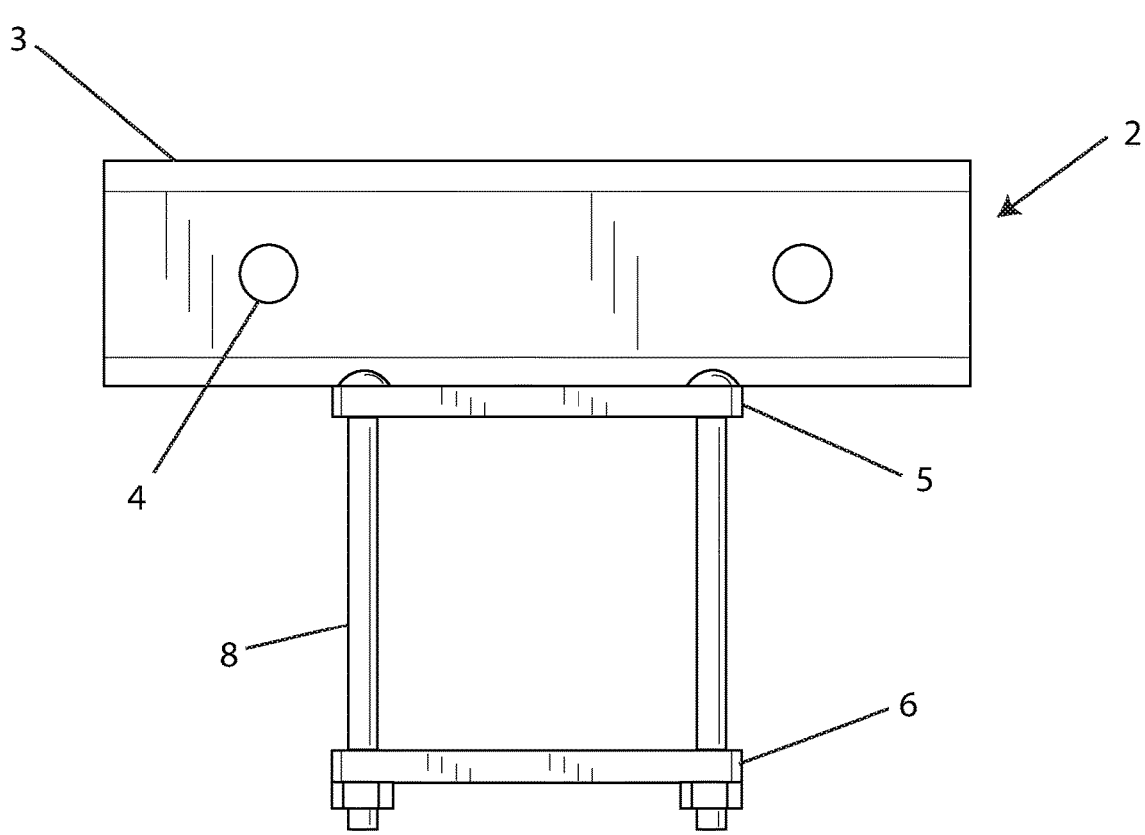
FIG. 8 is a right side elevation view of FIG. 1 thereof.
Figure 9:
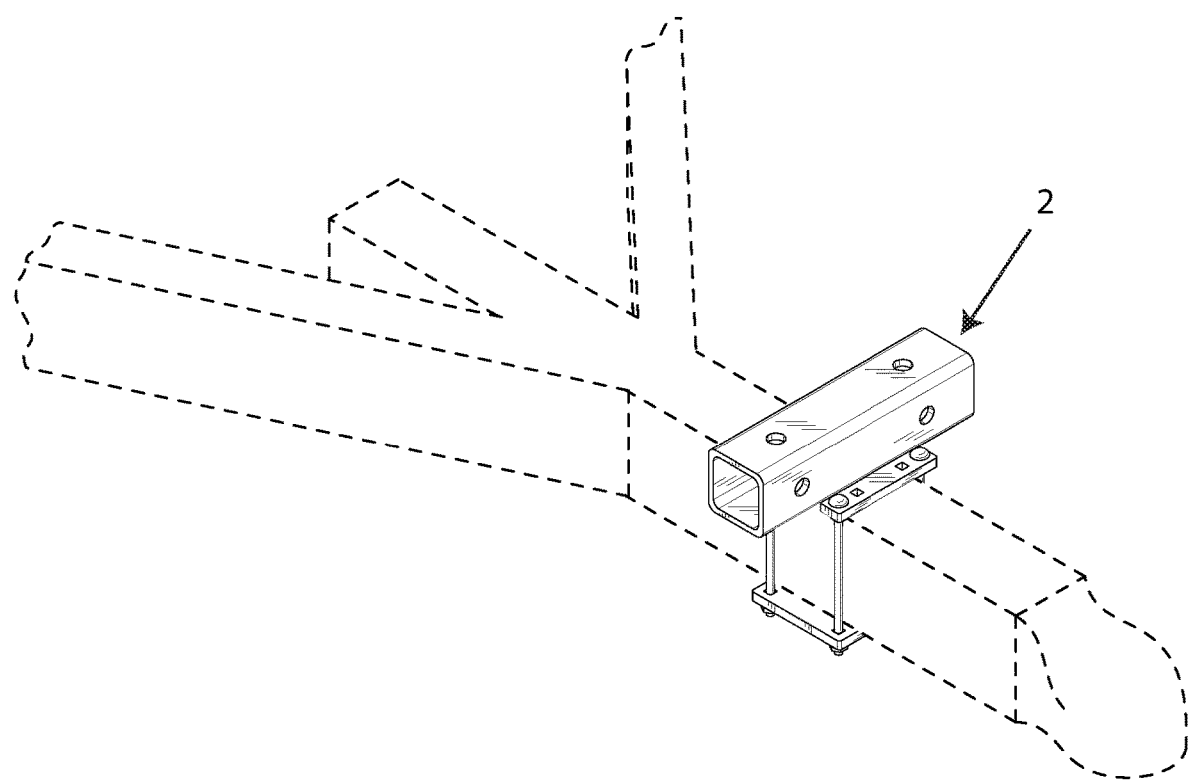
FIG. 9 is another perspective view of FIG. 1 thereof, showing the mounting bracket in use.
Figure 10:
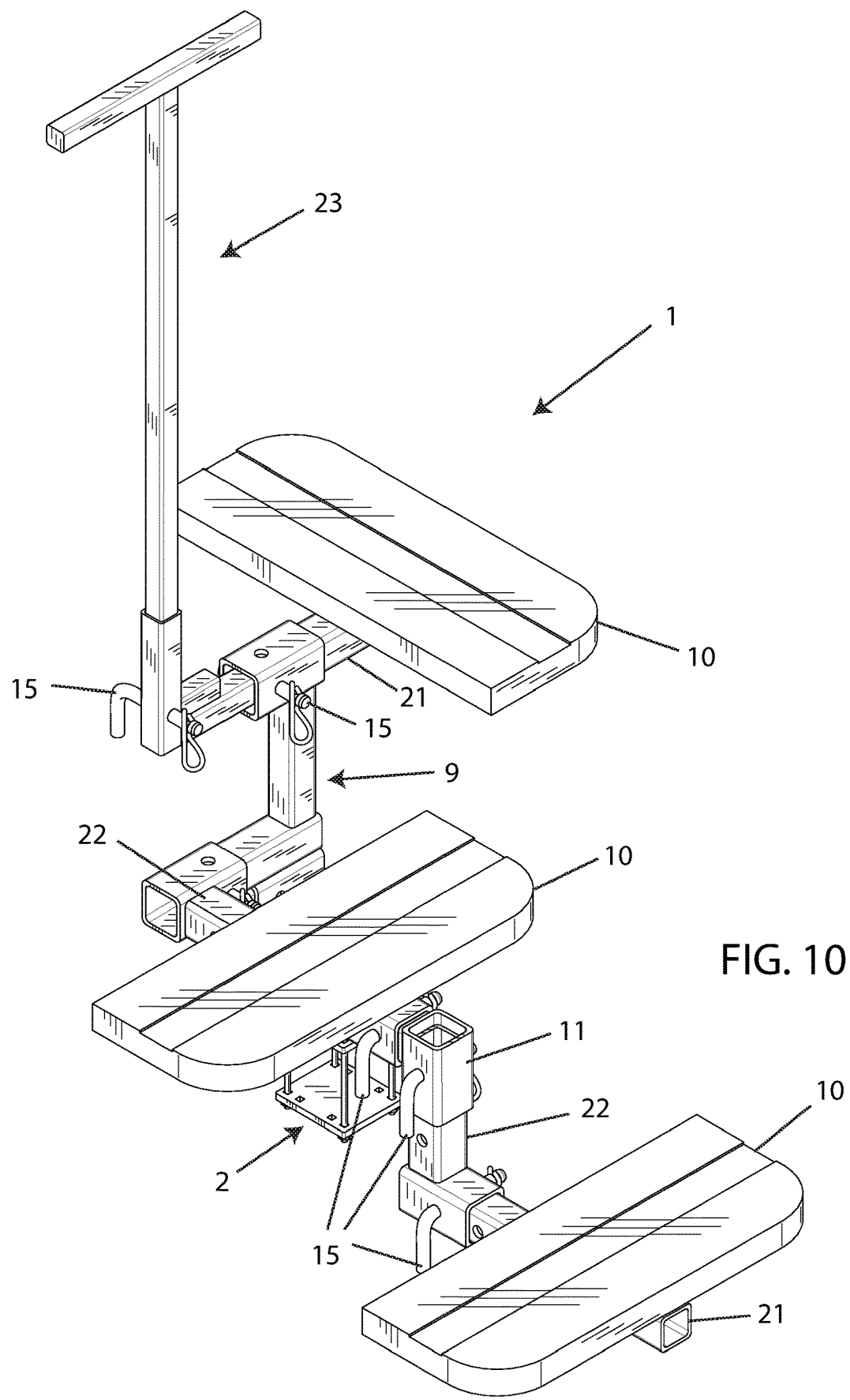
FIG. 10 is a perspective view of an embodiment of the hitch mount assembly showing a selected configuration of an assembled stair kit.

The broken lines shown in FIG. 9 represent unclaimed subject matter and form no part of the claimed invention.

DETAILED DESCRIPTION OF THE INVENTION

The present invention, preferred embodiments of the invention, and the accompanying drawing figures as described herein should not be construed as limited to the illustrated drawing. Rather the illustrated embodiment(s) are detailed to provide a thorough disclosure suitable to convey the scope of the invention to those skilled in the art. For the sake of simplicity, the conjunctive "and" may also be taken to include the disjunctive "or," and vice versa, whenever necessary to give the claims of this patent application the broadest interpretation and construction possible. Likewise, when the plural form is used, it may be taken to include the singular form, and vice versa.

Referring more particularly to the drawing by characters of reference, FIGS. 1-41 depict the hitch mount assembly 1, with the components shown assembled and disassembled. The hitch mount assembly 1 generally comprises (includes or has) at least one mounting bracket 2, a selective arrangement of a plurality of attachment members, and at least one hitch pin. The mounting bracket 2 has at least base mounting tube ("base tube") 3, two mounting plates 5, 6, and a plurality of fasteners 8. The components of the hitch mount assembly are easy and quick to assemble without the need to use many tools to secure either the mounting bracket to the frame, or one or more of the plurality of attachment members to the mounting bracket or to other attachment member. The plurality of attachment members allows the user to couple or attach one or more bike racks, spare tires, cargo carriers, watercraft trailer equipment, and other accessories (each, an "accessory," and collectively, "accessories"), while keeping the frame's existing hitch receiver available for other uses, for example, towing.

The hitch mount assembly may be installed onto or otherwise coupled to different types of mounting structures, bumpers, or frames, including but not limited to, the frames of trailers, watercraft trailer, and vehicles (collectively, "frame"). The frame may be any structure having a beam or other support member that can be sandwiched by the two mounting plates of the mounting bracket. The hitch mount assembly may be installed onto the frame in a selective variety of configurations without using any existing hitch receiver on the frame. Accordingly, the hitch mount assembly allows for easy transport and storage on a frame.

Not only is the hitch mount assembly a cost-effective option for effectively transporting and storing multiple attachment members and/or accessories, but it is also a time saver. Due to the structure of the various components of the hitch mount assembly, a user can easily and readily use one or more mounting brackets with a selective collection of attachment members to configure the assembly for maximum results. For example, a first mounting bracket with a selective arrangement of attachment members may be used on one side of a trailer frame or watercraft trailer frame to support a bike rack; a second mounting bracket with a selective arrangement of attachment members may be used at a different location on the frame with a riser coupled to the base tube, and with one or more steps for easy access to the trailer or watercraft trailer; and a third mounting bracket with a selective arrangement of attachment members may be used at yet another location on the frame to support a cargo carrier.

The hitch mount assembly utilizes a variety of mounting tubes that form the plurality of attachment members, each of which has a designated structural feature. The various structural features defined in the mounting tubes include, but are not limited to, holes for receiving a hitch pin, and open ends for coupling to a corresponding mounting tube or accessory. Each of the mounting tubes may vary in length, size, and configuration. Depending on the selective configuration of the plurality of attachment members, the hitch mount assembly can support up to approximately 2500 pounds of weight. Each of the various mounting tubes used in the hitch mount assembly has a 3/16-inch-thick wall. Using a thinner wall for the various mounting tubes would not be strong enough for the intended purpose of this hitch mount assembly.

Each mounting bracket 2 of the hitch mount assembly 1 has at least one base tube 3, two mounting plates 5, 6, and a plurality of fasteners 8. The mounting bracket 2 removably attaches or mounts to nearly any frame to support the plurality of attachments or accessories that are coupled to one or both ends of the base tube 3. For example, the mounting bracket may be installed on the front of a trailer frame at the bottle neck area, or along any frame section in which the two mounting plates can be sandwiched.

The base tube 3 of the mounting bracket 2 may be made of steel or high strength aluminum; however, steel is preferred. The base tube 3 is used as the anchor or base support for the hitch mount assembly 1. The base tube is removably mountable to the frame via one of the mounting plates either horizontally (parallel or perpendicular) or vertically to the frame. By using one or more attachment members, the user may further change the orientation of the hitch mount assembly regardless of the frame orientation.

The base tube 3 is essentially an elongated mounting tube having opposing open ends, two lateral sides, a top, and a bottom forming the mounting tube; a plurality of holes 4; and a seamless hollow interior. Each of the open ends of the base tube may independently receive and support one of the plurality of attachment members or an accessory. Accordingly, the user may customize the assembly configuration to suit his or her specific needs by coupling two different attachment members or accessories with a single mounting bracket that is secured to the frame. The two base tube open ends and the seamless hollow interior accommodate a snug, slip fit for receiving a 2-inch by 2-inch conventional hitch insert from an accessory or from one of the attachment members. The snug, slip fit prevents excessive movement within the base tube. The hollow seamless interior is distinguishable from a conventional mounting tube that contains a welded seam.

Each of the holes 4 defined in the base tube 3 can receive a hitch pin 15 therethrough after an attachment member or an accessory is coupled inside the base tube 3. As shown in at least FIGS. 1 and 2, the base tube 3 defines eight holes 4: two spaced apart holes on each lateral side, two spaced apart holes on the top, and two spaced apart holes on the bottom. Each of the two spaced apart holes on the first lateral side are aligned with each of the two spaced apart holes on the second lateral side. Each of the two spaced apart holes on the top of the base tube are aligned with each of the two spaced apart holes on the bottom of the base tube. As shown in FIGS. 1 and 2, the lateral side two holes are essentially arranged as one hole at a proximal (first) end and one hole at a distal (second) end of each lateral side. Also as shown in FIGS. 1 and 2, the top and bottom of the base tube each has two holes essentially arranged as one hole at a proximal end and one hole at a distal end of the respective top and bottom of the base tube.

Figure 11:
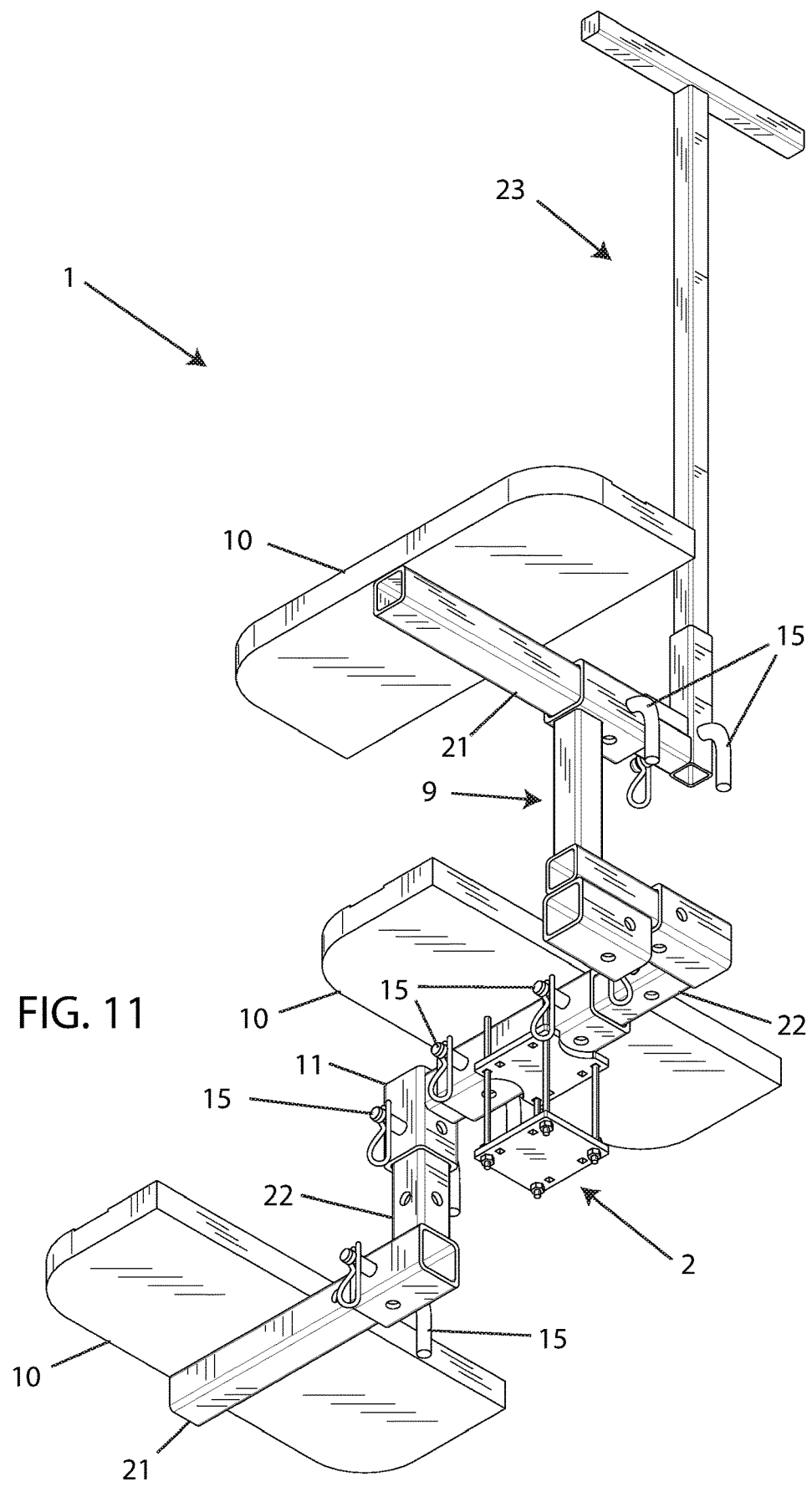
FIG. 11 is another perspective view of FIG. 10 thereof.
Figure 12:
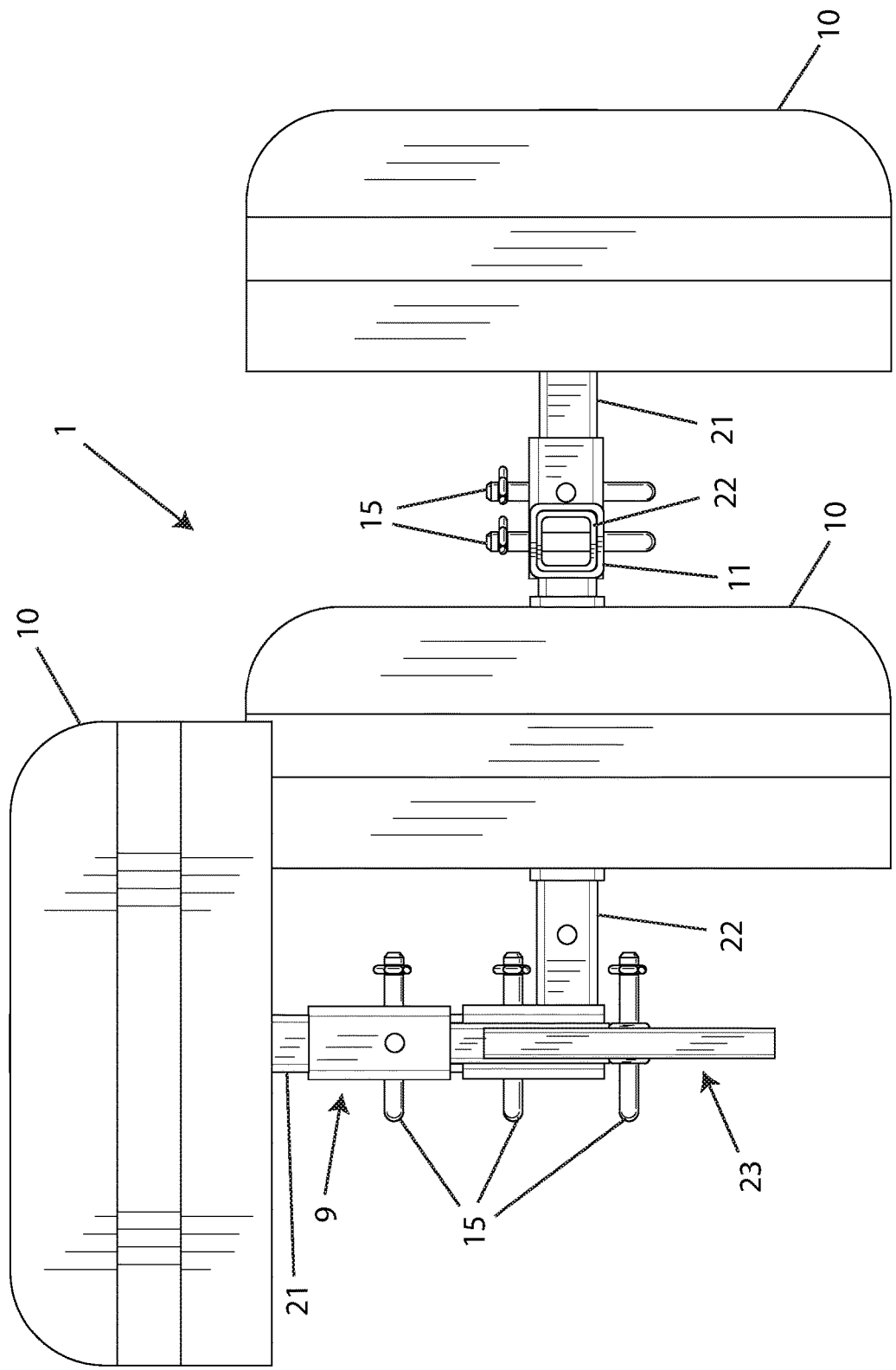
FIG. 12 is a top plan view of FIG. 10 thereof.
Figure 13:
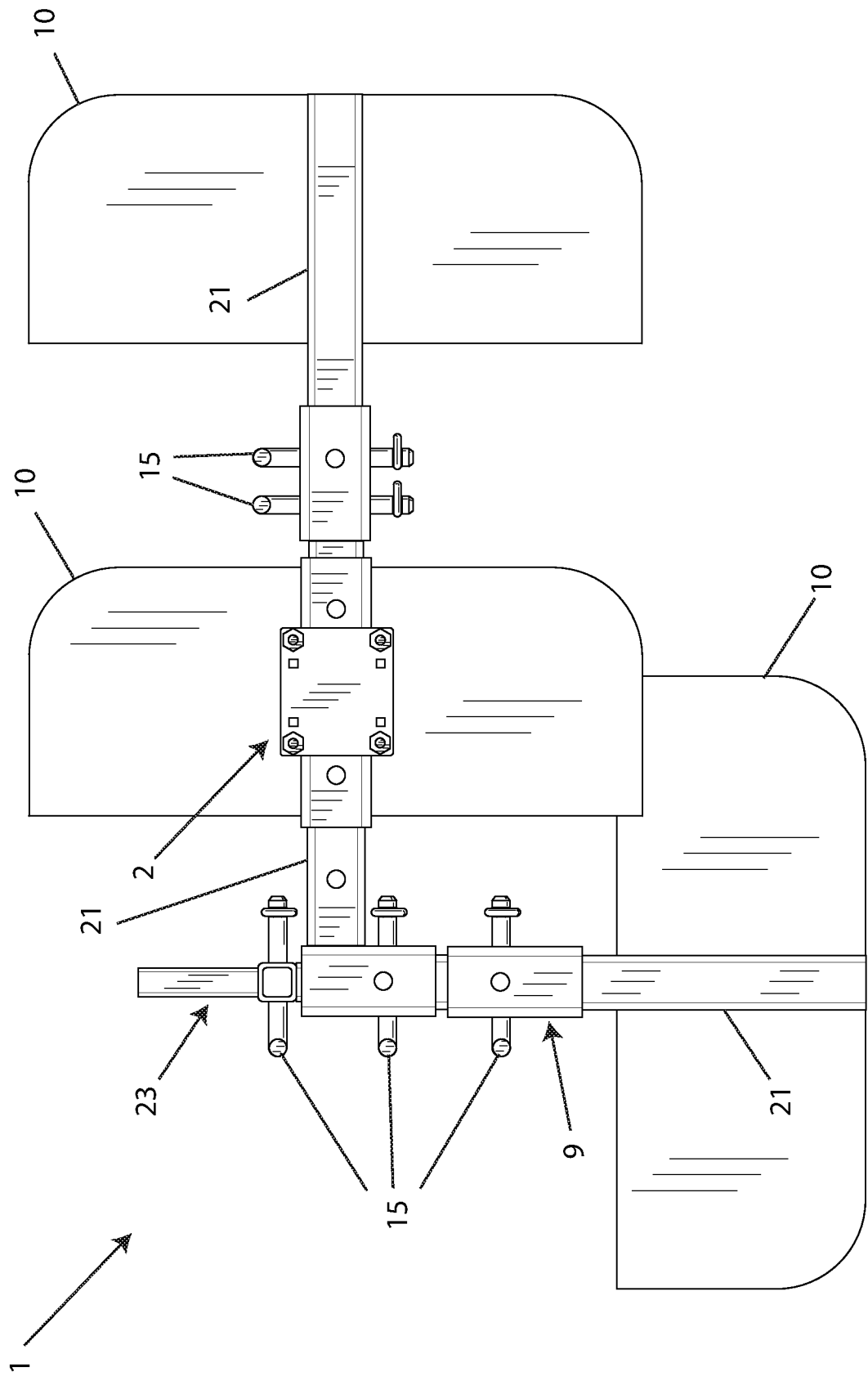
FIG. 13 is a bottom plan view of FIG. 10 thereof.
Figure 14:
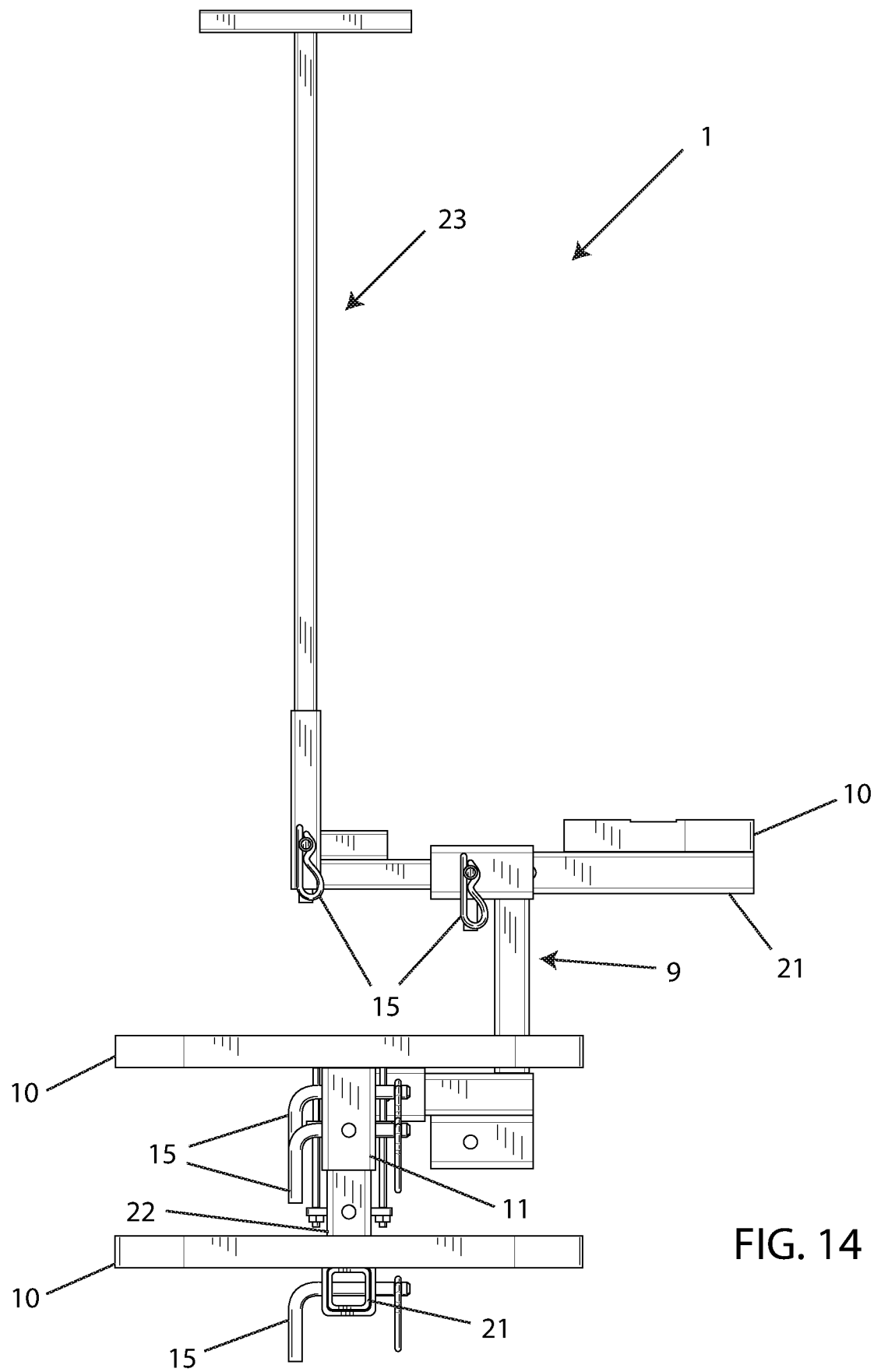
FIG. 14 is a front elevation view of FIG. 10 thereof.
Figure 15:
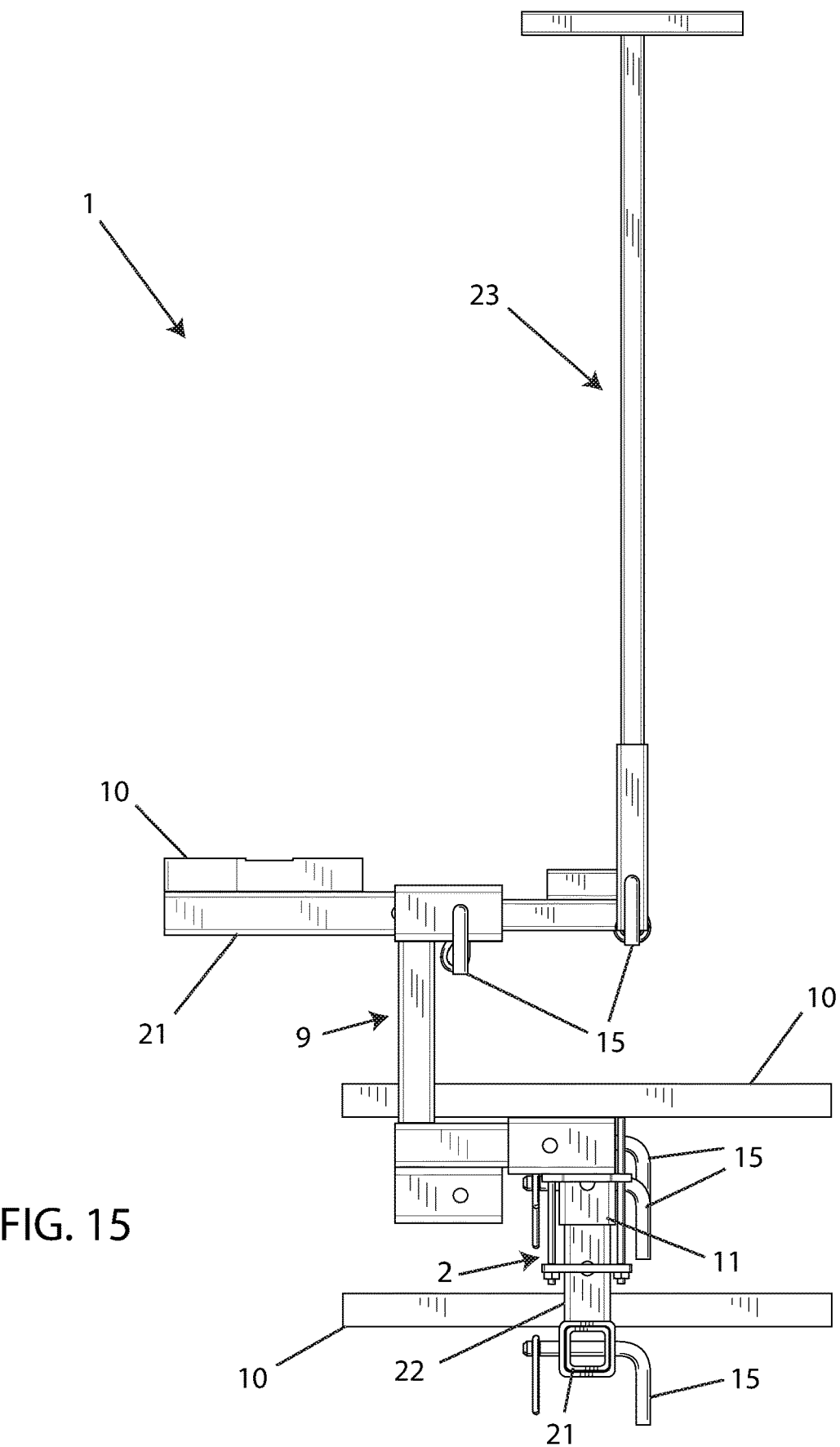
FIG. 15 is a rear elevation view of FIG. 10 thereof.
Figure 16:
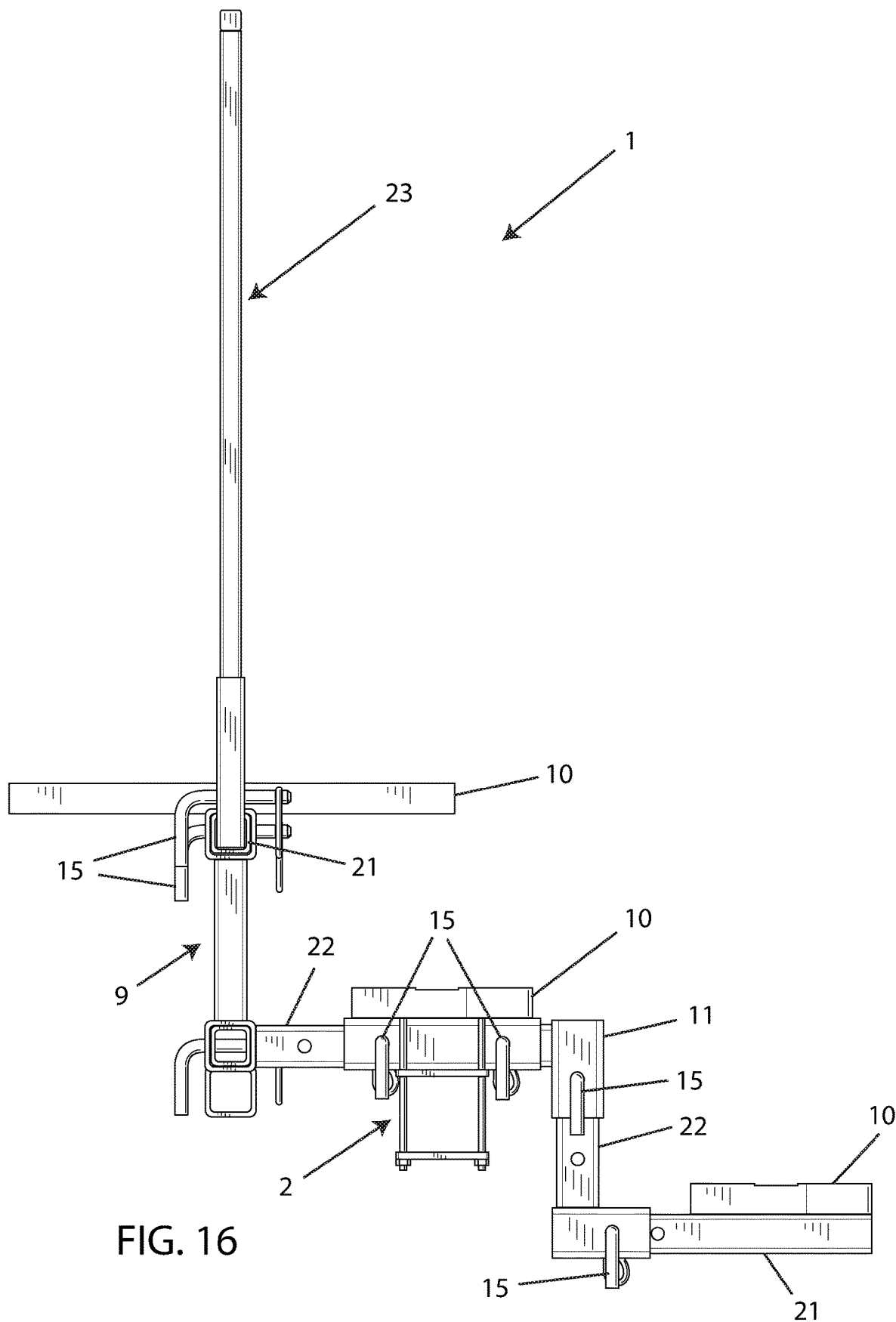
FIG. 16 is a left side elevation view of FIG. 10 thereof.
Figure 17:
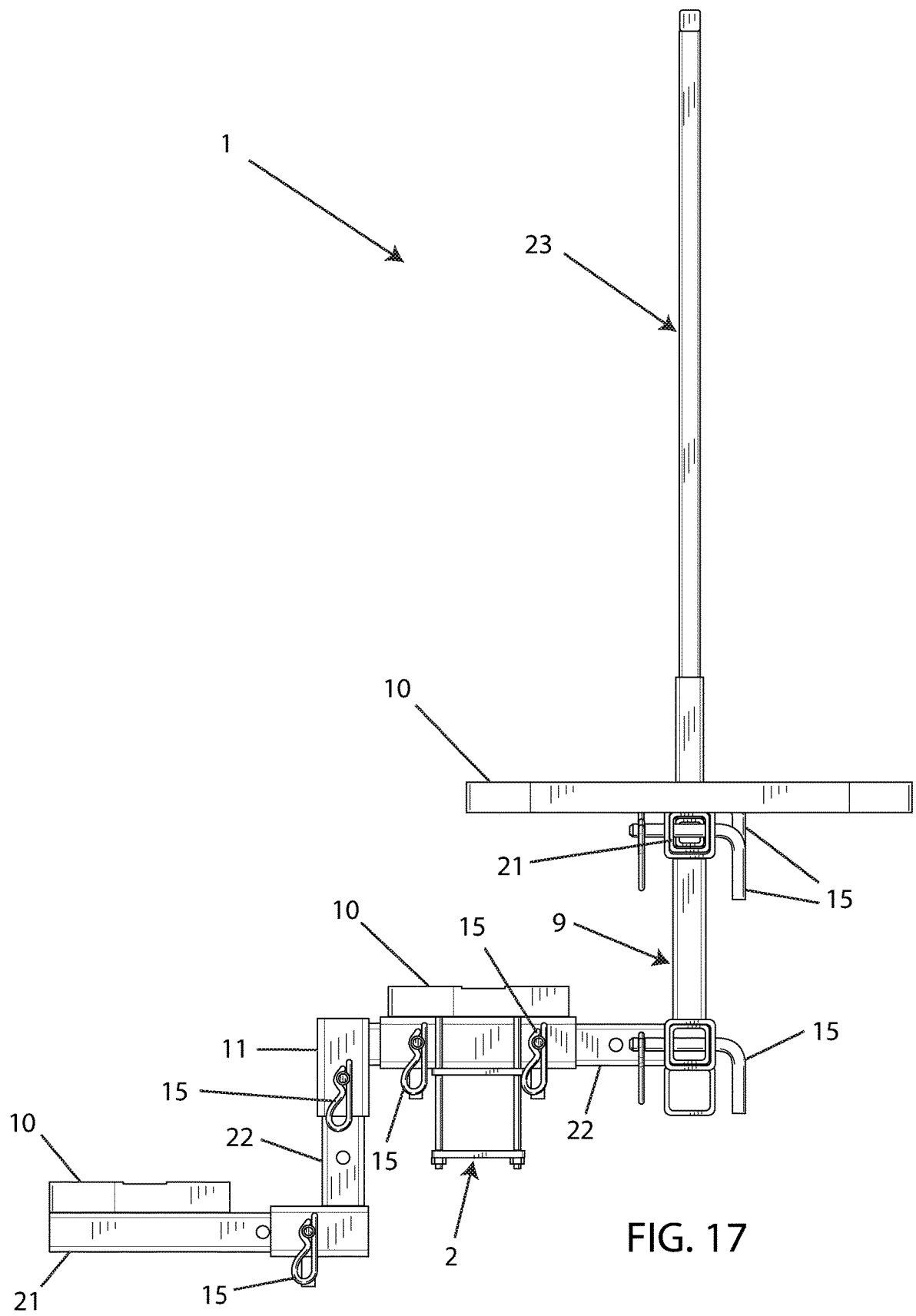
FIG. 17 is a right side elevation view of FIG. 10 thereof.

The corresponding holes at the proximal end of the lateral sides and the top and bottom, respectively, and the corresponding holes at the distal end of the lateral sides and the top and bottom, respectively, each align forming a set of holes for receiving a hitch pin therethrough. The hitch pin 15 may be a quick-release hitch pin or a locking hitch pin with keys. The hitch pins are drawn through the appropriate aligned holes in the slidably coupled mounting tubes to secure the mounting tubes together. Selecting which set of holes should receive a hitch pin, either the lateral side holes or the top-bottom holes, depends on the orientation and number of the attachment members or accessories coupled to the base tube. For example, if only one attachment member is coupled to the base tube, then only one hitch pin is inserted through one set of holes in the base tube and in the corresponding holes of the attachment member. As shown in FIG. 11, one attachment member is inserted into and coupled to each open end of the base tube. Here, two hitch pins are used to secure the two independent attachment members through the holes in the lateral sides of the base tube. An attachment member may be coupled to the base tube either vertically or horizontally, then secured with the hitch pin drawn through the appropriate set of holes in the base tube and attachment member.

Each of the two mounting plates 5, 6 of the mounting bracket 2 is essentially a flat rectangular or square plate that further defines a plurality of bores. Each mounting plate is independent from the other, but both are used to essentially sandwich or otherwise securely abut against the frame with the fasteners. Each mounting plate may be made from steel. In a preferred embodiment, each mounting plate is ¼ inch thick. The custom mounting bracket is the foundation of the hitch mount assembly to which varying selective combinations of attachment members and accessories may be attached. The two mounting plates of the mounting bracket can be interchanged with each other.

As shown in the figures, the base tube 3 of the mounting bracket 2 is permanently affixed to or otherwise welded to the top of at least one of the mounting plates 5. The base tube is preferably centered on the mounting plate. Each mounting plate 5, 6 has a width wider than the width of the base tube 3. Each mounting plate has a depth or thickness more than the depth or thickness of the base tube. The length of each mounting plate is shorter than the base tube. In another embodiment (not shown), each of the two mounting plates has a base tube affixed to it, with the mounting plates sandwiching the frame at the respective unaffixed surfaces of each mounting plate. Up to four independent attachment members or accessories, each having its own configurations or extensions, may be each supported within one of the open ends of the base tubes when two base tubes are used.

In the embodiment shown in the figures, a first mounting plate (upper mounting plate) 5 is a plate having a contoured or indented edge on a forward section and a rear section of the mounting plate. The second mounting plate (bottom or lower mounting plate) 6 does not have any contoured or intended edge. A purpose for the contoured edge on the forward and rear sections of the mounting plate 5 is to accommodate a hitch pin 15 drawn through the top and bottom aligned holes 4 of the base tube 3. FIG. 2 shows the contoured forward and rear sections of the mounting plate along with the bottom holes of the base tube.

Preferably and as shown in the figures, each mounting plate 5, 6 further defines two rows of bores 7, with each row having four spaced apart square bores for eight total square bores per mounting plate. Each bore 7 is spaced approximately in 1-inch intervals. The two rows of bores are preferably defined in each mounting plate at 1-inch, 2-inch, 3-inch, and 4-inch arrangements. When assembled, a first of the two mounting plates is positioned above the frame, and a second of the two mounting plates is positioned below the frame, with the first mounting plate being arranged and aligned parallel to the second mounting plate. When the two mounting plates are aligned, the bores of the first mounting plate correspond to the bores of the second mounting plate. The aligned bores form a bore set, with the two mounting plates having four bore sets to accommodate different frame sizes. The size of the frame to which the mounting plates are sandwiched determines which of the bore sets receives one of the plurality of fasteners. Preferably, only four bore sets are used when removably securing the mounting plates to the frame. Each bore set receives one fastener therethrough.

The location of the bores in the mounting plates allows a user to use the same mounting bracket on frames having different widths. For example, the mounting plates may be removably mounted to a 2-inch wide frame or a 3-inch wide frame by installing a fasteners at the two outermost bore sets and a fastener at the two 2-inch or two 3-inch bore sets. In another embodiment, the mounting plates may be removably mounted to a 4-inch wide frame by installing the four fasteners at the 1-inch and 4-inch bore sets.

During installation as shown in FIG. 9, a first mounting plate 5 is positioned on top of the frame and a second mounting plate 6 is positioned underneath the frame, with the mounting plates being parallel to the other. Next, the plurality of fasteners 8 are drawn through the appropriate bore sets 7 defined in the mounting plates 5, 6 to secure and sandwich the mounting plates 5, 6 against the frame. This mounting plate sandwich secures the mounting bracket to the frame and eliminates all movement on the frame after the attachment members are assembled. Each of the plurality of fasteners 8 is preferably a threaded square carriage bolt with a locking nut and a washer. Preferably, the carriage bolt threads extend from a distal portion of each carriage bolt to approximately half the height of the carriage bolt. The length of the carriage bolts depends on the height of the frame plus a 1-inch allowance on each side of the mounting plate. The carriage bolts are a minimum grade 5 hardness for achieving optimal results for the hitch mount assembly. For example, a 3×3 inch frame requires 5-inch carriage bolts. In another example, a 3×4 inch frame requires 6-inch carriage bolts. The user may select which of the four bore sets should receive the four fasteners so that the two mounting plates have the most snug fit about the frame as possible.

The plurality of attachment members includes one or more of the following: extenders, risers 9, hand poles 23, steps 10, tire carriers, and jack mounts. An extender is one of the plurality of attachment members, and may include one or more types of extenders, each of which is essentially different types of mounting tubes. Each type of extender is essentially used to extend the length of the hitch mount assembly when configuring one or more of the plurality of attachment members and/or accessories away from, below, or above the frame, or to change the orientation of the attachment members and/or accessories from horizontal to vertical and vice versa. Like the base mounting tube, each extender is preferably made of steel and has a seamless hollow interior. Some of the extenders have opposing open ends to further accommodate receiving other mounting tubes. Other extenders have at least one closed end (insertion member) for inserting into one of the open ends of the base tube, or another attachment member, or accessory. The extender may be a straight extender, a single open-end weld-on mount member ("single extender") 16, an extender defining an opposing open ends ("double extender") 12, a coupler extender, a T-extender, a short L extender 11, or a long L extender 22.

The straight extender is essentially an elongated mounting tube defining two spaced apart holes near a proximal lateral side of the mounting tube and two spaced apart holes near the distal lateral side of the mounting tube. The opposing lateral side of the straight extender defines corresponding and aligned holes, forming four sets of holes. The sets of holes are adapted to receive a hitch pin, the selection of which depends on the user's needs. The straight extender has opposing ends that may be used as insertion members, with at least one end being closed. The straight extender may be coupled to the base tube, one or two attachment members, and/or one or two accessories. The length of the straight extender is preferably either 5-inches, 6.5-inches, or 8-inches. The ends have 2×2-inch dimensions. The straight extender is essentially an insert to add more length to the hitch mount assembly during installation.

The double extender 12 is a mounting tube defining opposing open ends, four lateral sides, and a seamless hollow interior. The lateral sides of the double extender are essentially identical. Each lateral side of the double extender 12 defines two spaced apart holes 13 near a proximal end of double extender 12 and two spaced apart holes 13 near the distal end of the double extender 12. The opposing lateral side of the double extender defines corresponding and aligned holes, forming four sets of holes. The sets of holes 13 are adapted to receive a hitch pin 15, the selection of which depends on the user's needs. The double extender may be coupled to the base tube, one or two attachment members, and/or one or two accessories. The double extender is essentially an insert to add more length to the hitch mount assembly during installation. The double extender and straight extender are nearly identical, except that the straight extender has at least one closed end, and preferably two opposing closed ends. Alternatively, the double extender may be welded to any solid steel part of the frame.

The single extender 16 is the smallest size of the extenders of the plurality of attachment members. The single extender is a single weld on mounting tube. The single extender is a substantially rectangular, short mounting tube that defines at least one open end for coupling to another attachment member, the base tube, or an accessory. The single extender 16 has four lateral sides, with each lateral side defining a hole 17 therethrough. Each hole 17 is aligned with and corresponds to the hole 17 on the opposing lateral side. The holes 17 receive a hitch pin 15 for securing the single extender 16 to another attachment member, the base tube 3, or to an accessory. The single extender may be used as part of the riser 9. In another example, the single extender may be welded directly to any solid steel location of the frame.

The coupler extender is an elongated mounting tube having a first portion with an insertion member and a second portion defining an open end. The first portion of the coupler extender is smaller than and extends from the second portion of the coupler extender. The first portion of the coupler extender has one lateral side defining three spaced apart holes therethrough that are aligned with and correspond to three spaced apart holes defined in the opposite lateral side of the couple extender. The corresponding, aligned holes in the lateral sides form three sets of holes. The second portion of the coupler extender defines at least a one hole therethrough. A hitch pin may be inserted through any set of holes of the coupler extender. The coupler extender allows for a 4-inch, 6-inch, or 8-inch extension the attachment member or accessory. The coupler extender has one 2-inch insertion member and one 2-inch receiving open end.

A T-extender is provided when a double extender is welded to or otherwise permanently and affixed perpendicularly to second mounting tube. The second mounting tube may have at least one closed end. The second mounting tube has two lateral sides, each lateral side defining at least one hole, preferably two holes, that is aligned with and corresponds to the opposing lateral side hole(s).

The long L-extender 22 is essentially a single extender 16 perpendicularly abutting an elongated mounting tube at ninety degrees, forming an L-shape. The single extender portion of the L-extender defines opposing open ends and has two lateral sides each defining a single hole 25 for receiving a hitch pin 15. The elongated mounting tube defines one open end and has two lateral sides. Each lateral side of the elongated mounting tube has at least two spaced apart holes 25, each hole 25 for receiving a hitch pin 15. Each hole of one lateral side is aligned with the corresponding hole of the opposing lateral side. Preferably, one lateral side of the elongated mounting tube has three spaced apart holes that correspond to the three spaced apart holes on the opposing lateral side. The three holes defined in the elongated mounting tube of the L-extender allows for 4-inch, 5½-inch, or 7-inch coupling to the base tube, another attachment member, or an accessory.

The short L-extender 11 is essentially two single extenders arranged into an L-shape, wherein one end of the single extender abuts the side of another single extender. Here, one of the single extenders 16 is larger than the other single extender, with the larger single extender being the same size as the single extender used with the riser 9. Each of the single extenders defines a single hole 26 through opposing lateral sides, for a total of four holes. The holes defined in the smaller single extender are located near a distal end of the smaller single extender. The holes defined in the larger single extender are preferably centrally located on the larger single extender.

To form a Z-extender (not shown) or U-extender (not shown), a short L-extender and a long L-extender are coupled together to form an adjustable U-shaped extender or Z-shaped extender to provide more versatility to the assembly configuration. The orientation of the base tube can be changed to use the hitch mount assembly with a vertical frame by using an L-extender.

Figure 18:
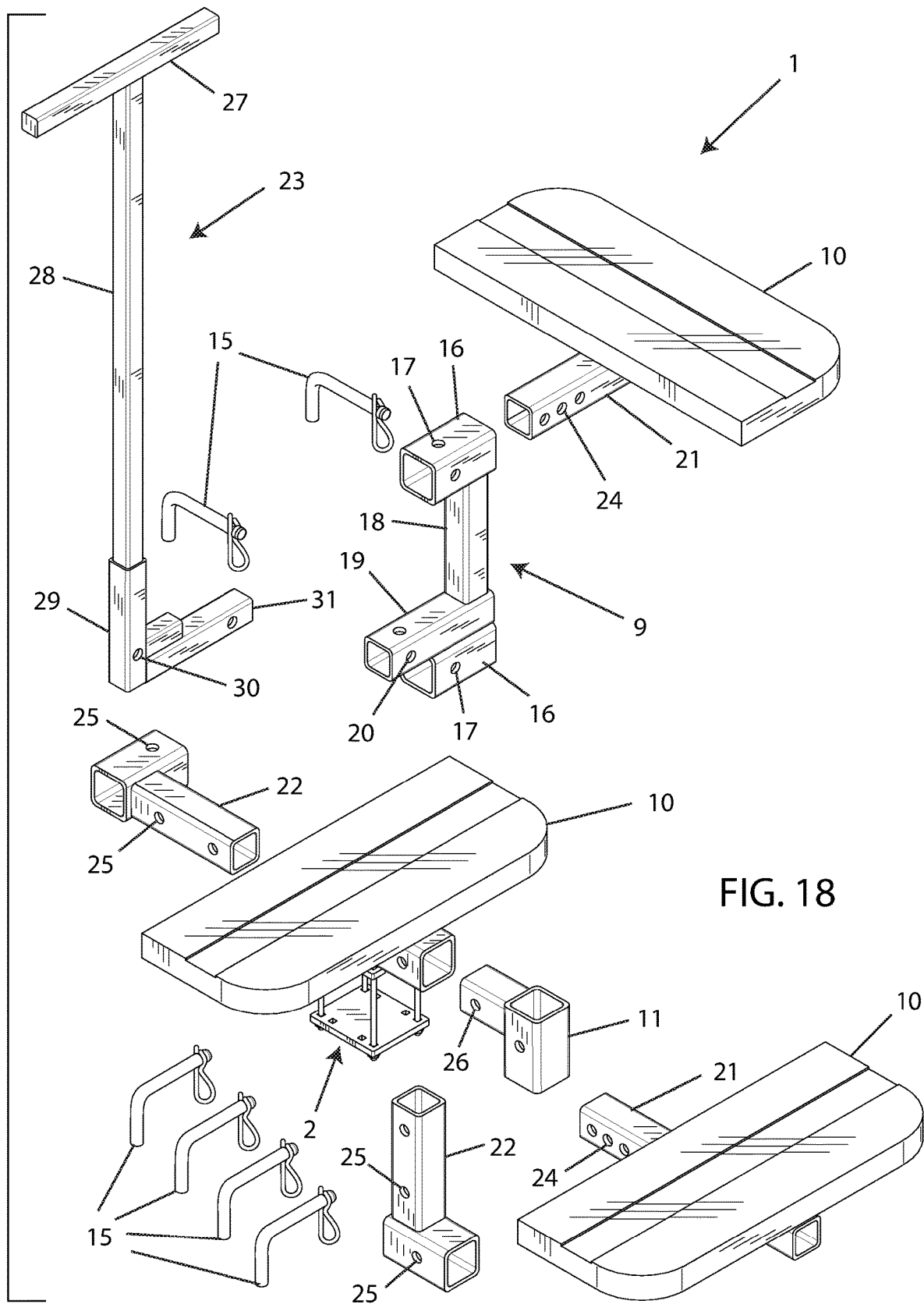
FIG. 18 is a perspective view of FIG. 10, showing the components of the stair kit disassembled.
Figure 19:
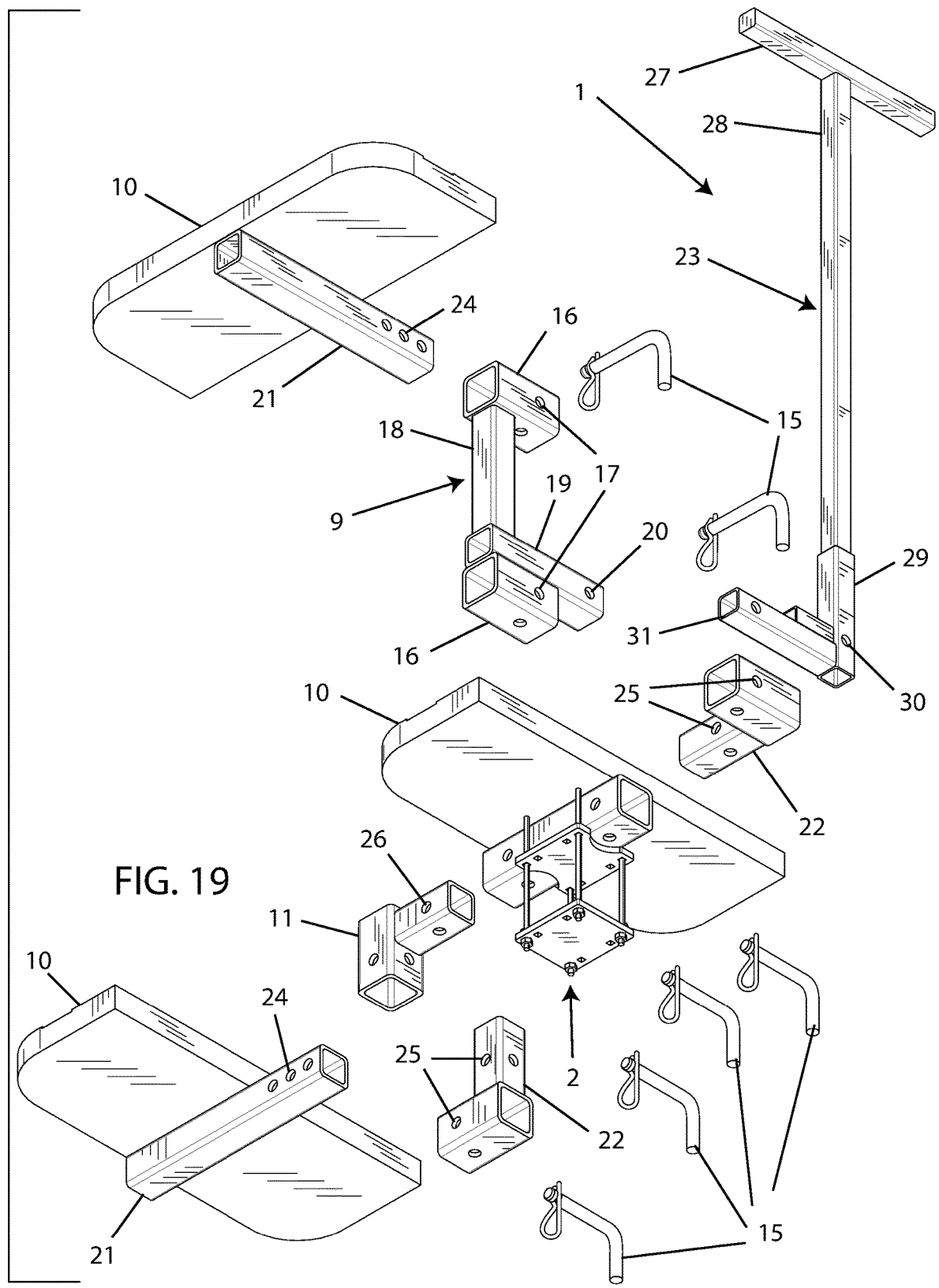
FIG. 19 is another perspective view of FIG. 18 thereof.
Figure 20:
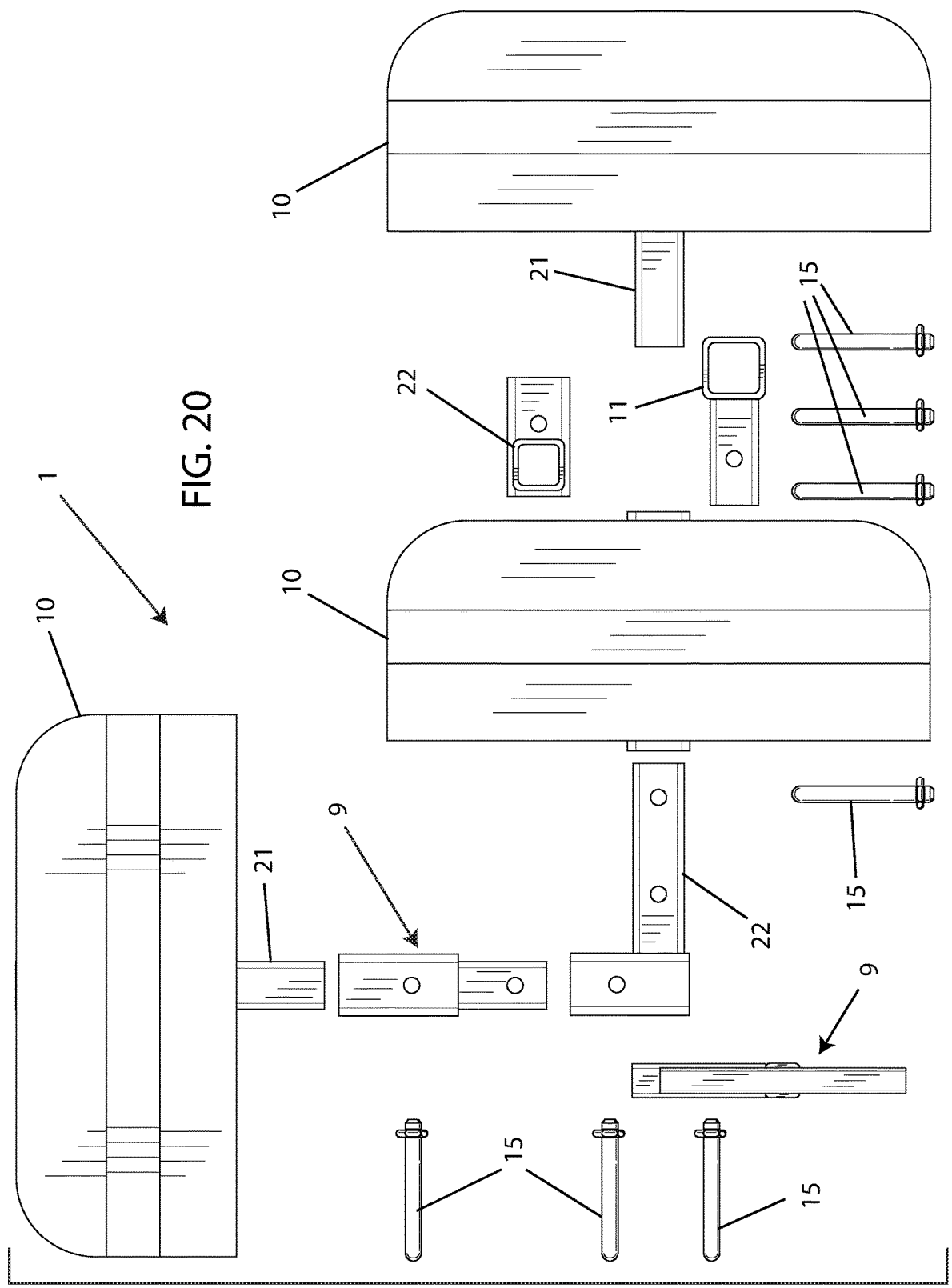
FIG. 20 is a top plan view of FIG. 18 thereof.
Figure 21:
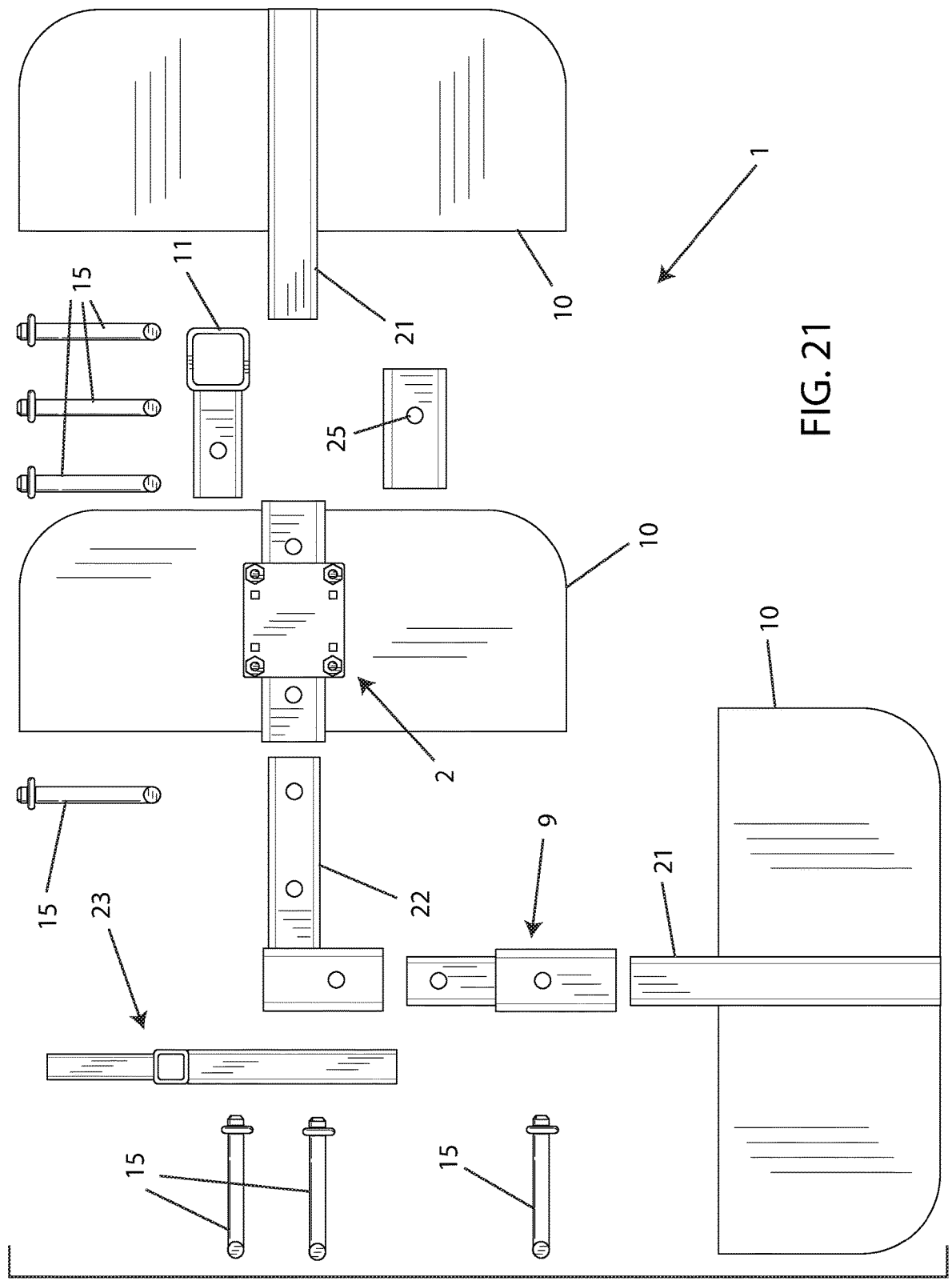
FIG. 21 is a bottom plan view of FIG. 18 thereof.
Figure 22:
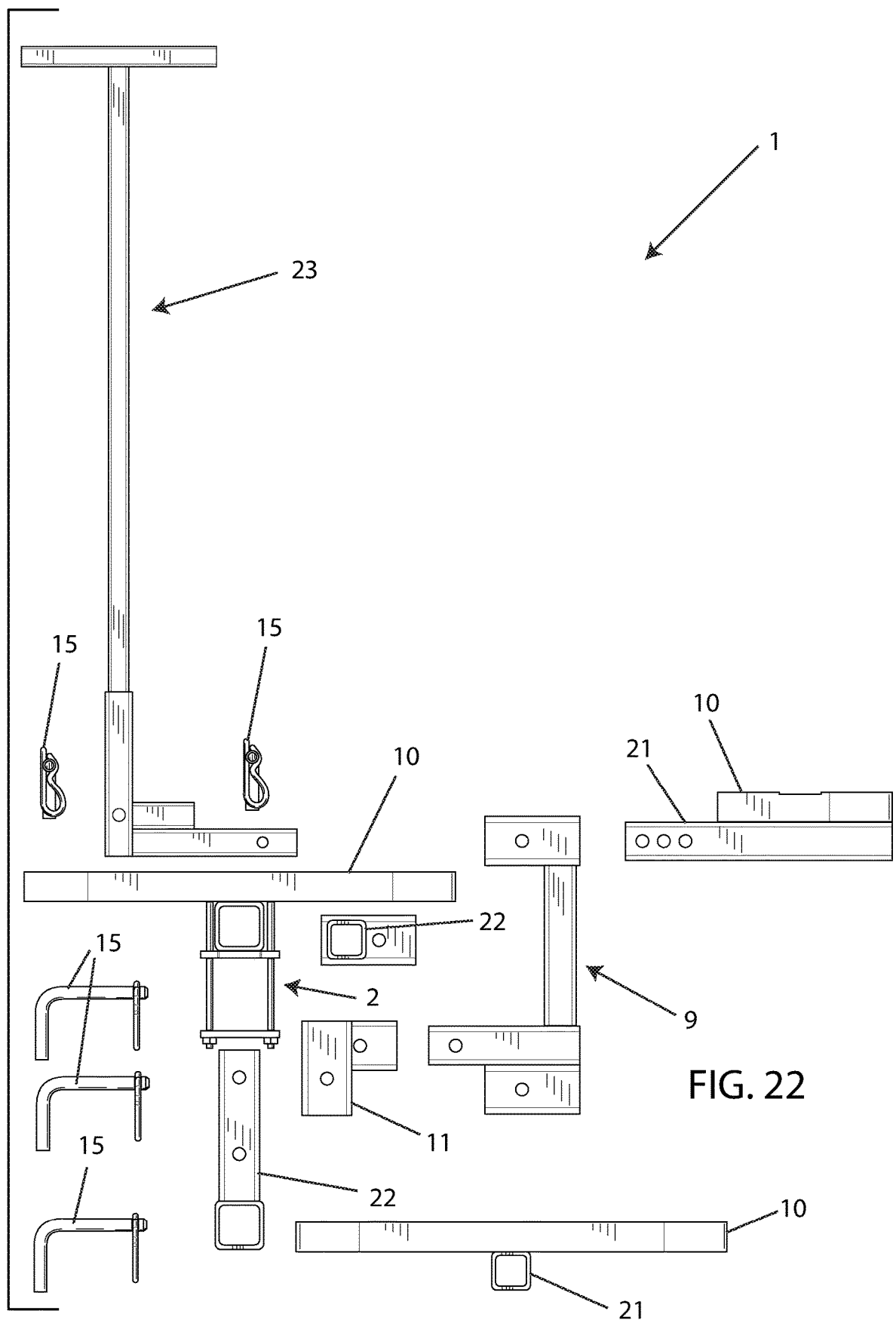
FIG. 22 is a front elevation view of FIG. 18 thereof.
Figure 23:
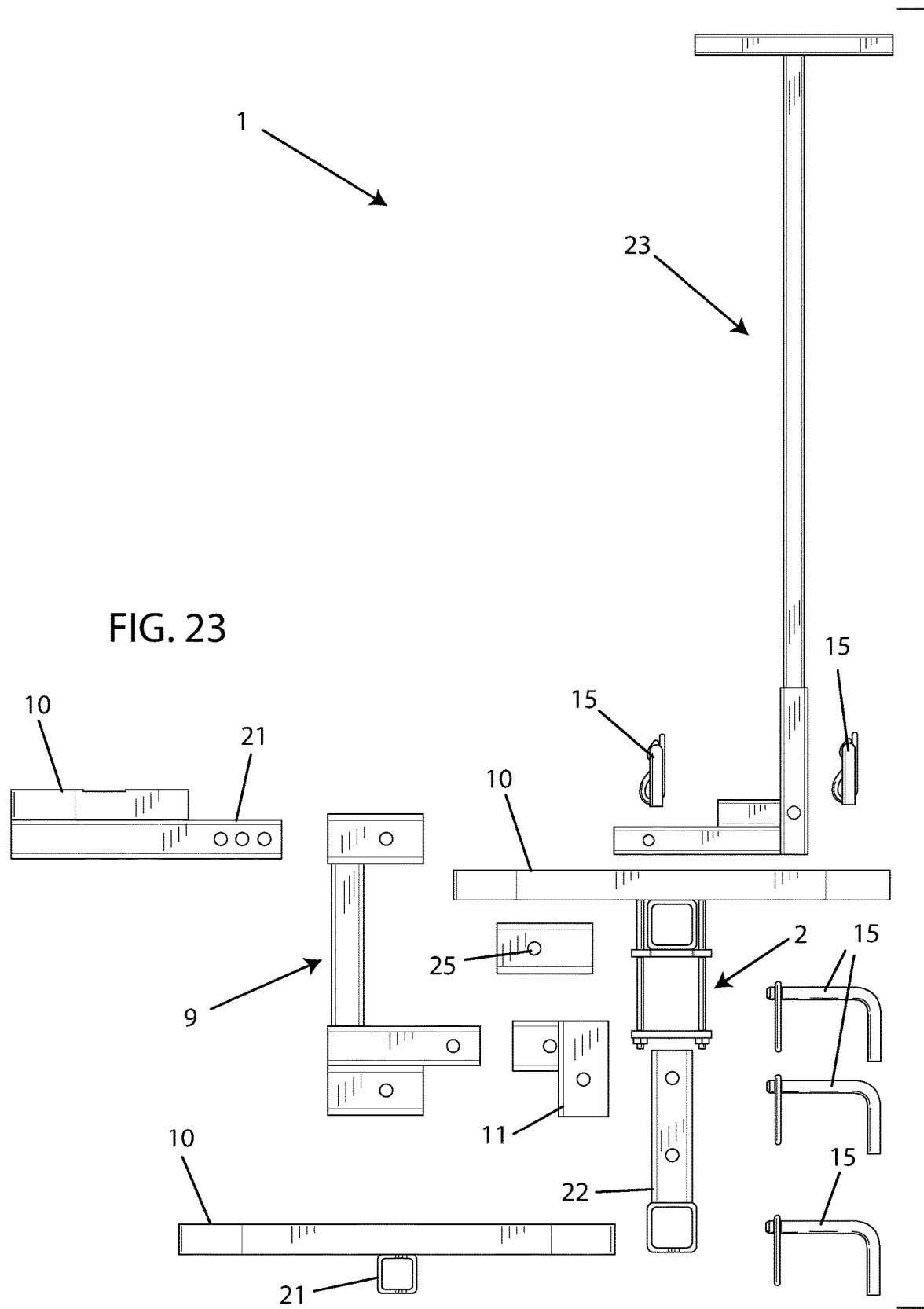
FIG. 23 is a rear elevation view of FIG. 18 thereof.
Figure 24:
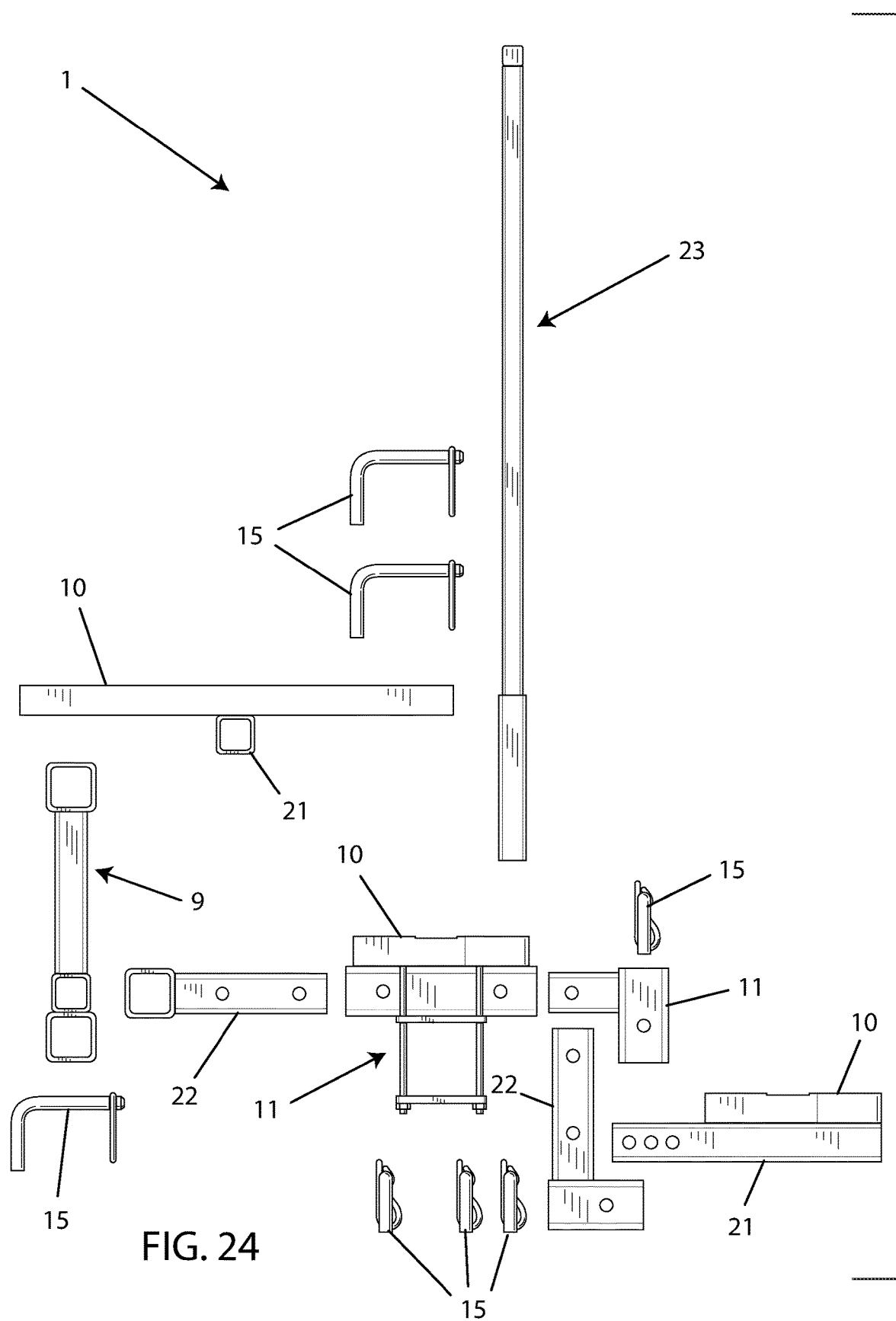
FIG. 24 is a left side elevation view of FIG. 18 thereof.
Figure 25:
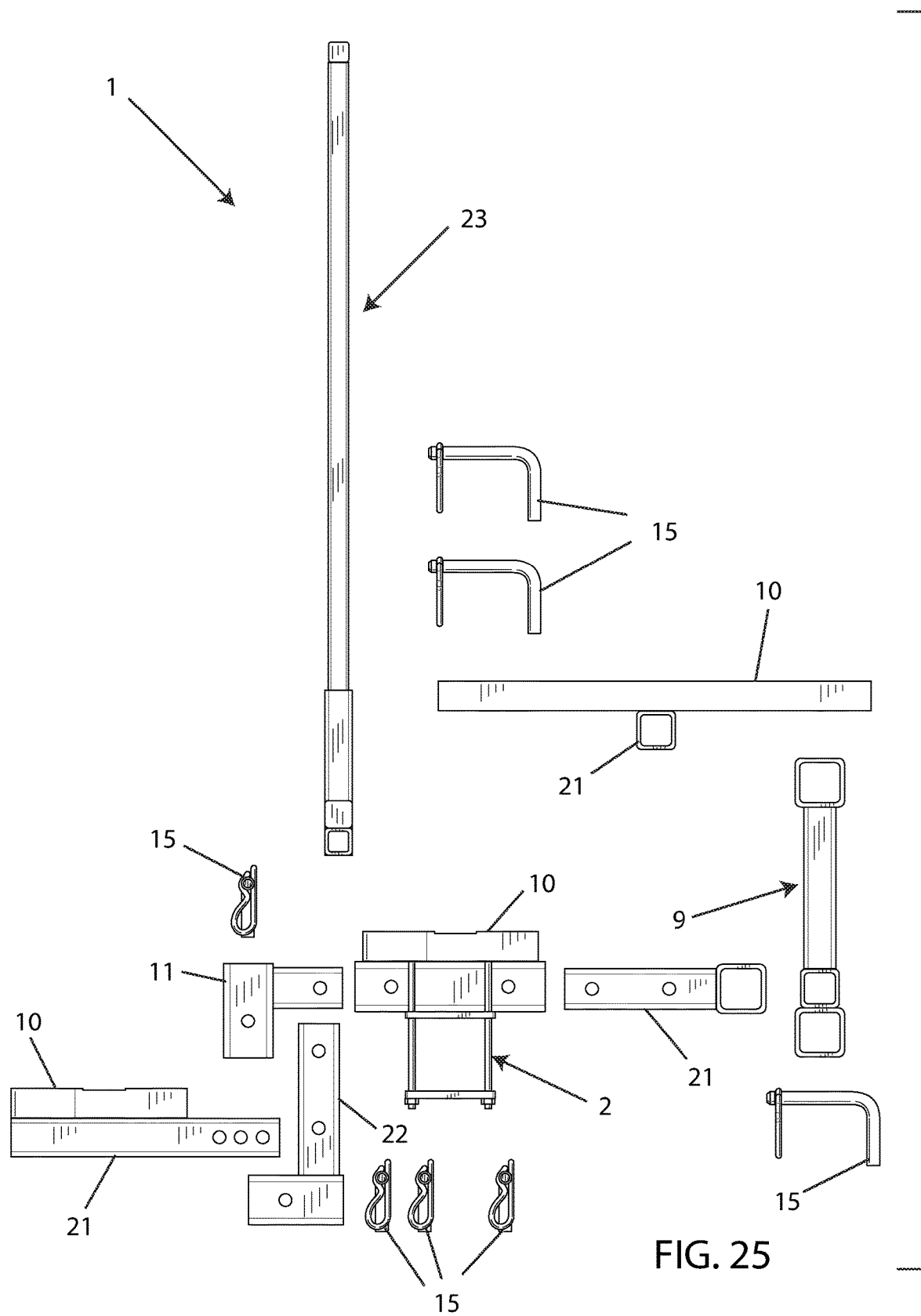
FIG. 25 is a right side elevation view of FIG. 18 thereof.
Figure 26:
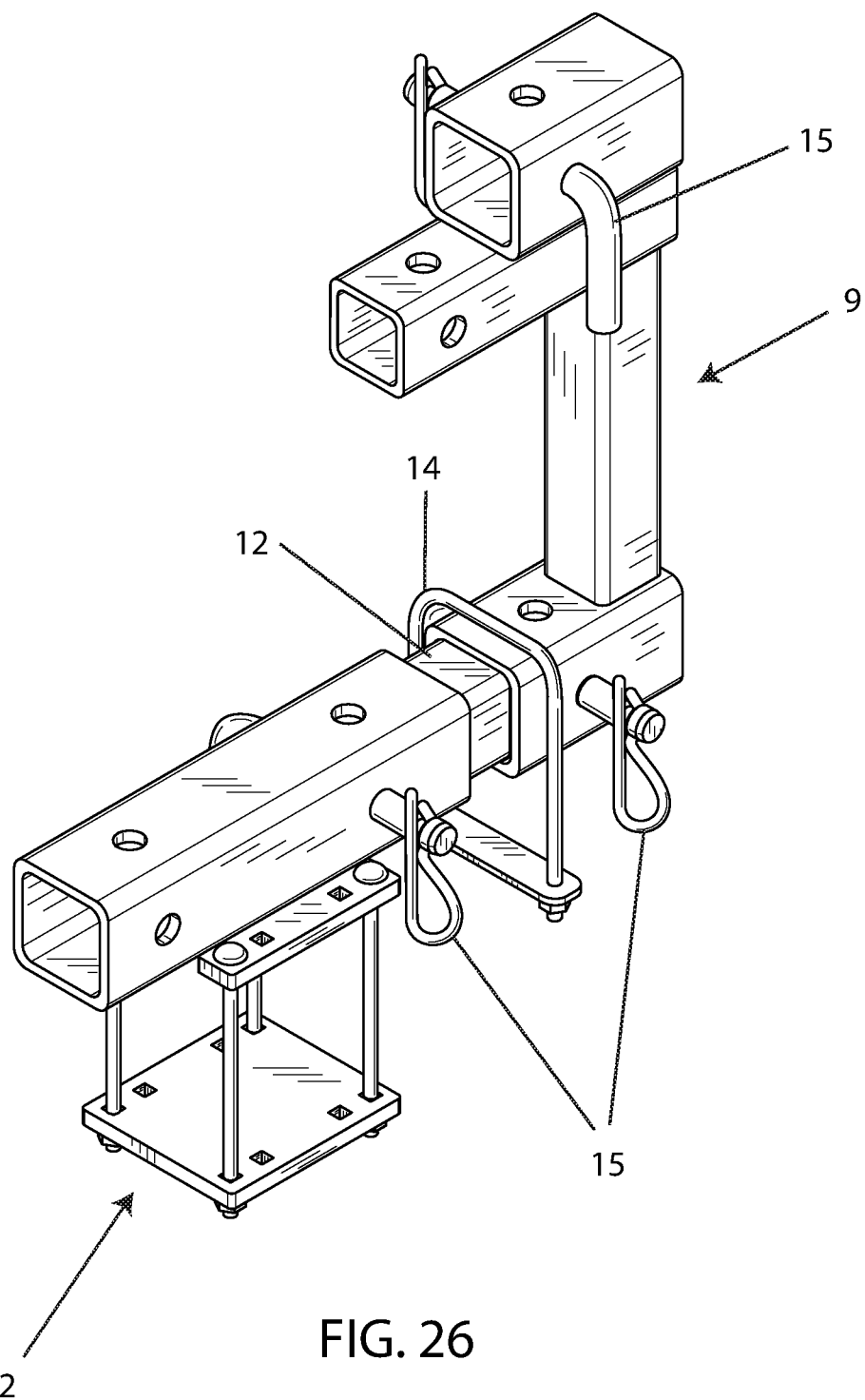
FIG. 26 is a perspective view of another embodiment of the hitch mount assembly showing a selected configuration of an assembled trailer mount kit.
Figure 27:
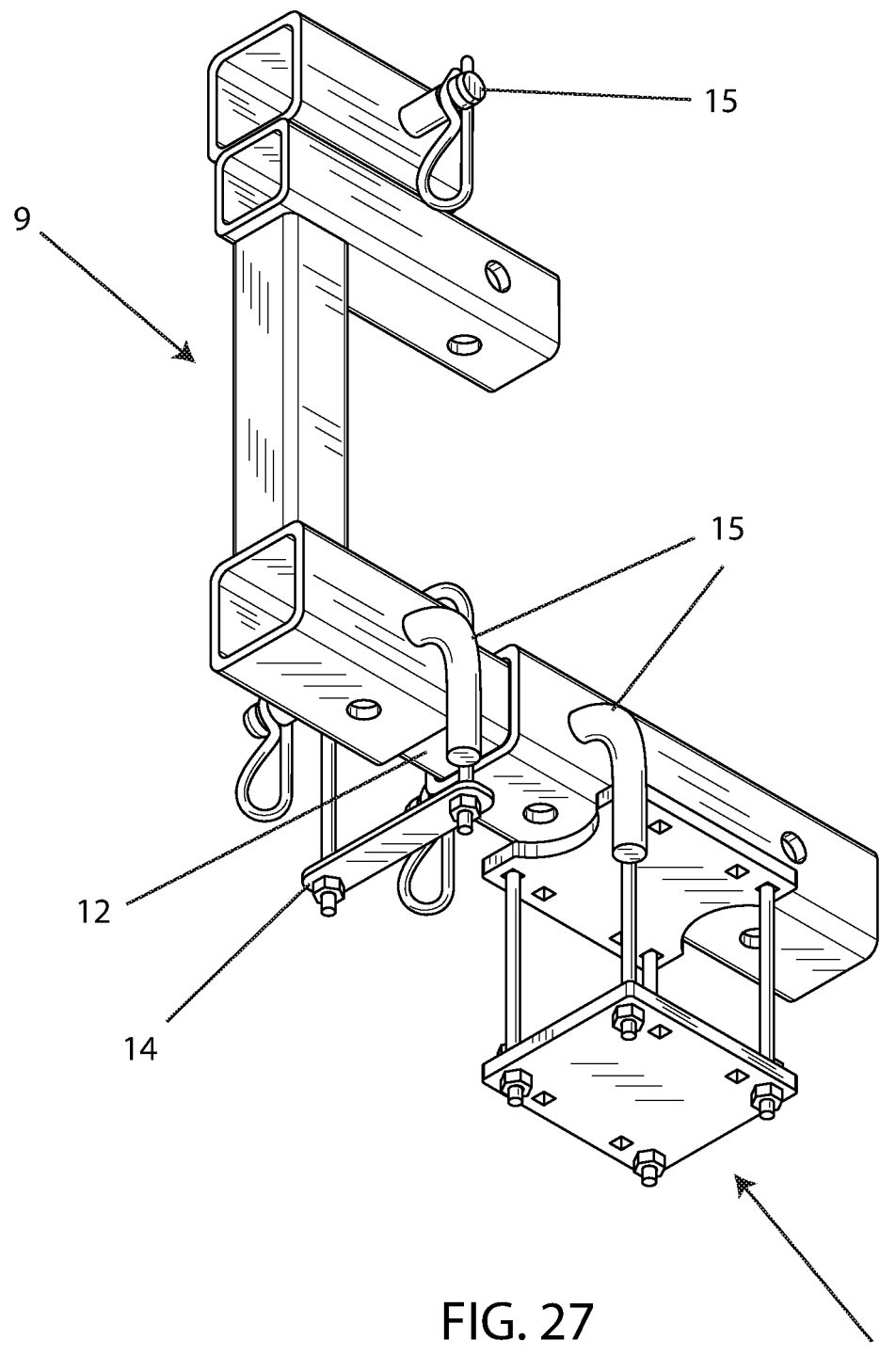
FIG. 27 is another perspective view of FIG. 26 thereof.
Figure 28:
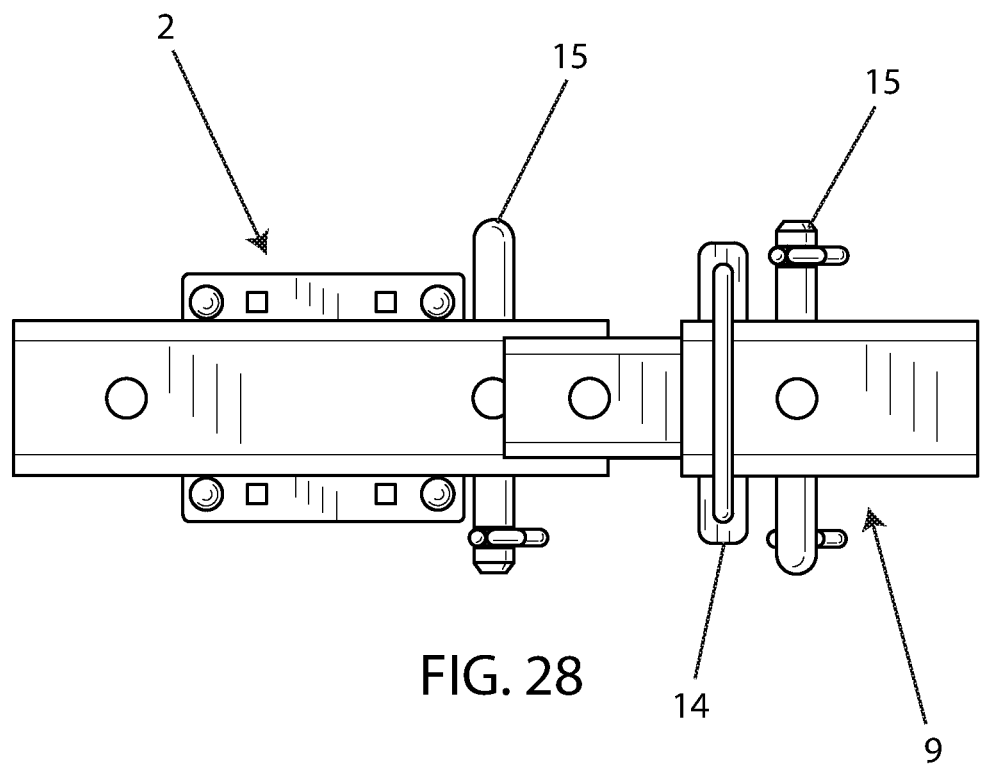
FIG. 28 is a top plan view of FIG. 26 thereof.
Figure 29:
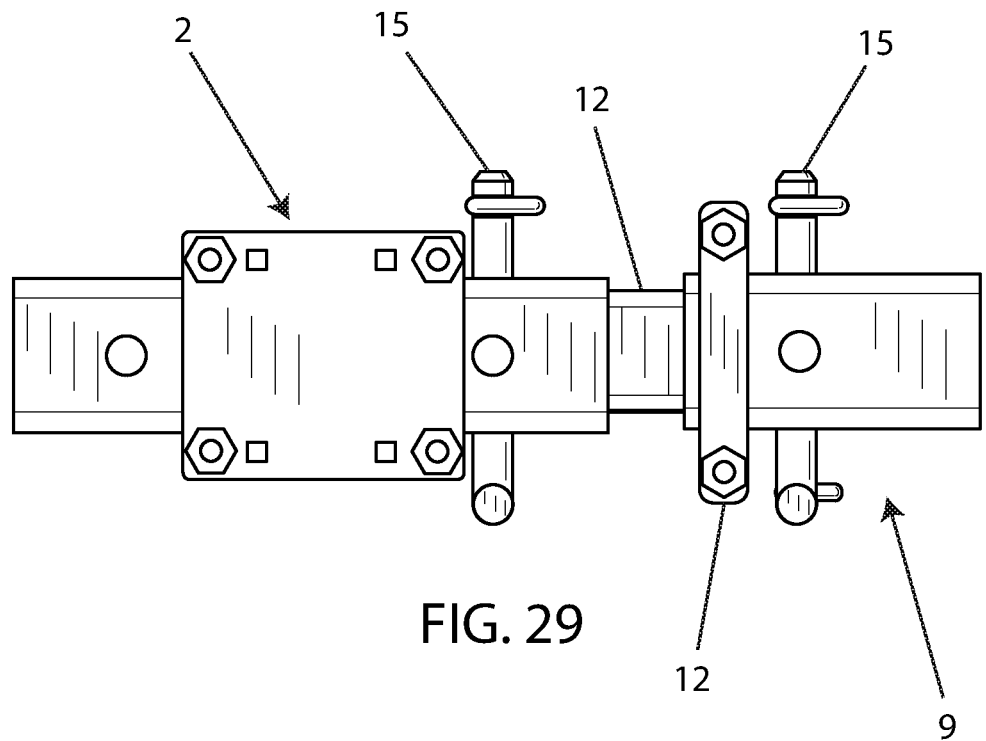
FIG. 29 is a bottom plan view of FIG. 26 thereof.
Figure 32:
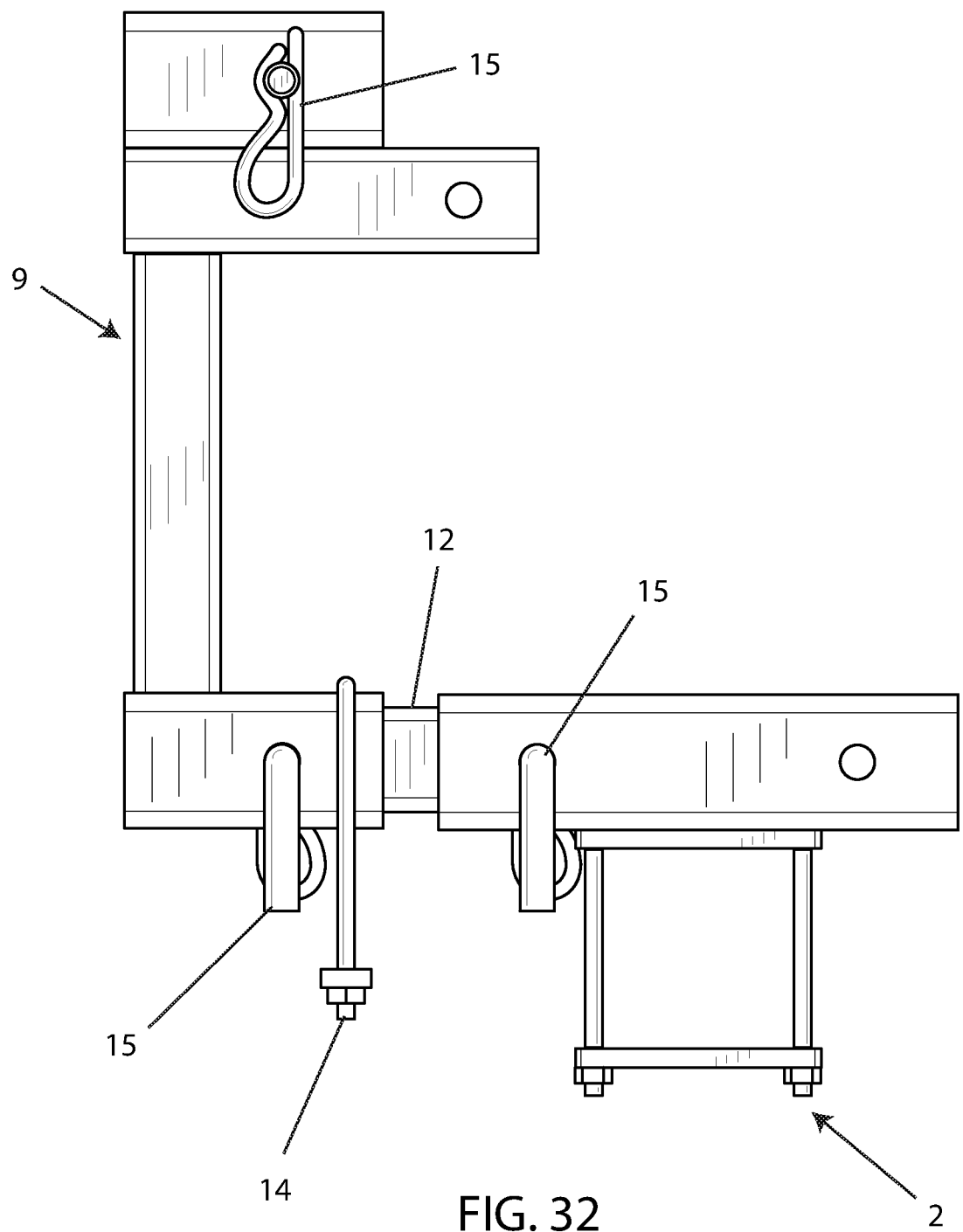
FIG. 32 is a left side elevation view of FIG. 26 thereof.
Figure 33:
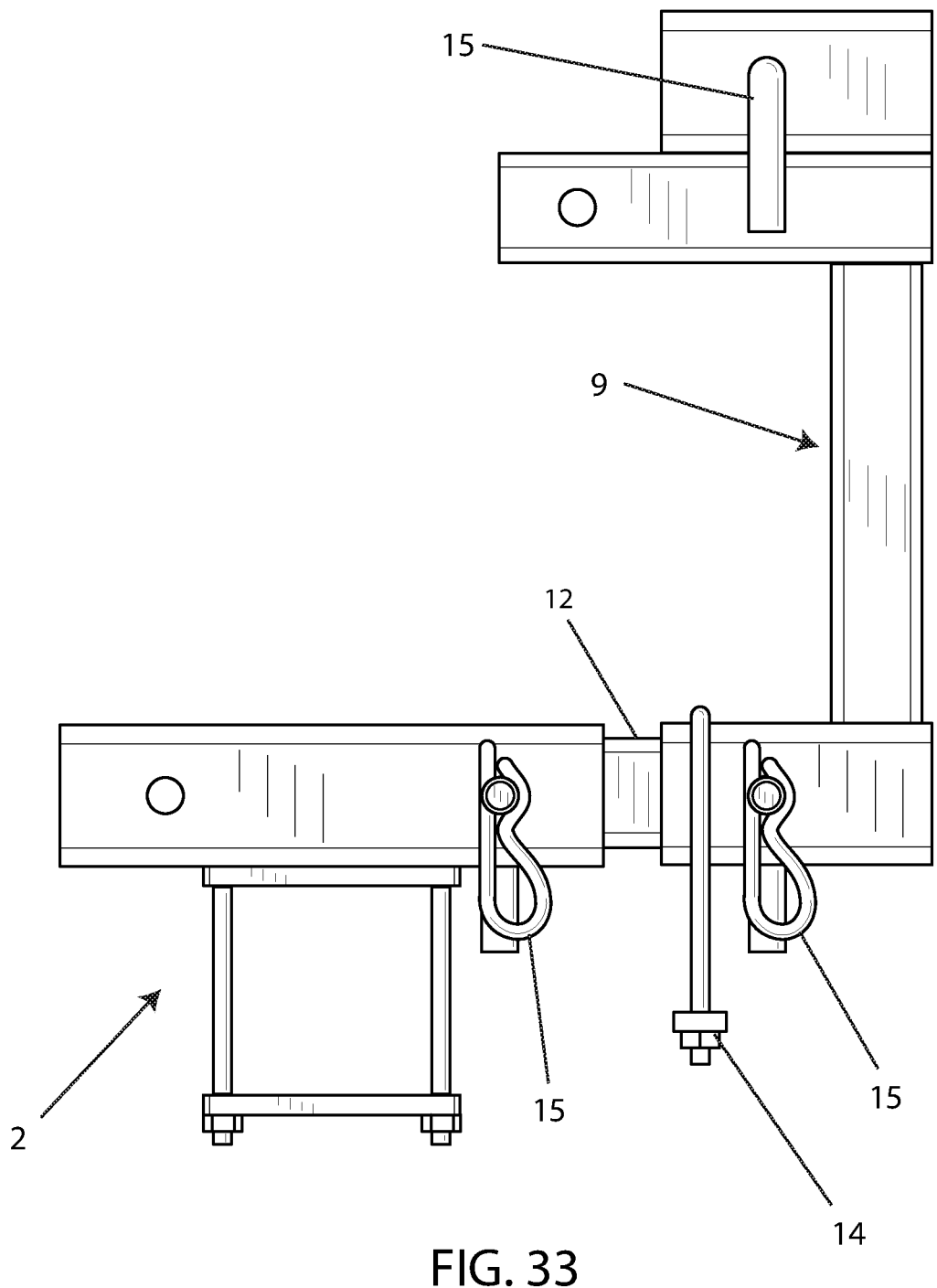
FIG. 33 is a right side elevation view of FIG. 26 thereof.
Figure 34:
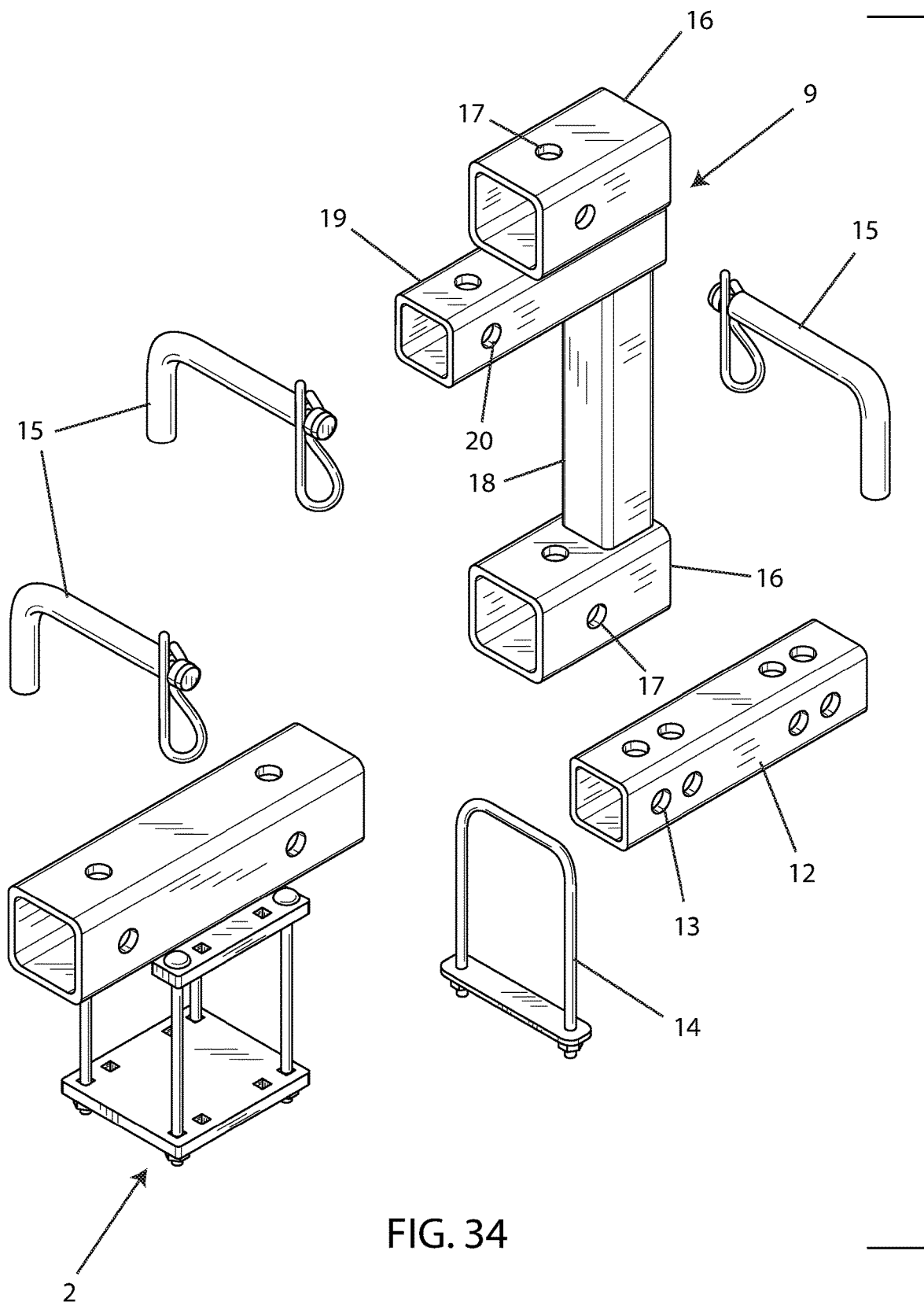
FIG. 34 is a perspective view of FIG. 26, showing the components of the trailer mount kit disassembled.
Figure 35:
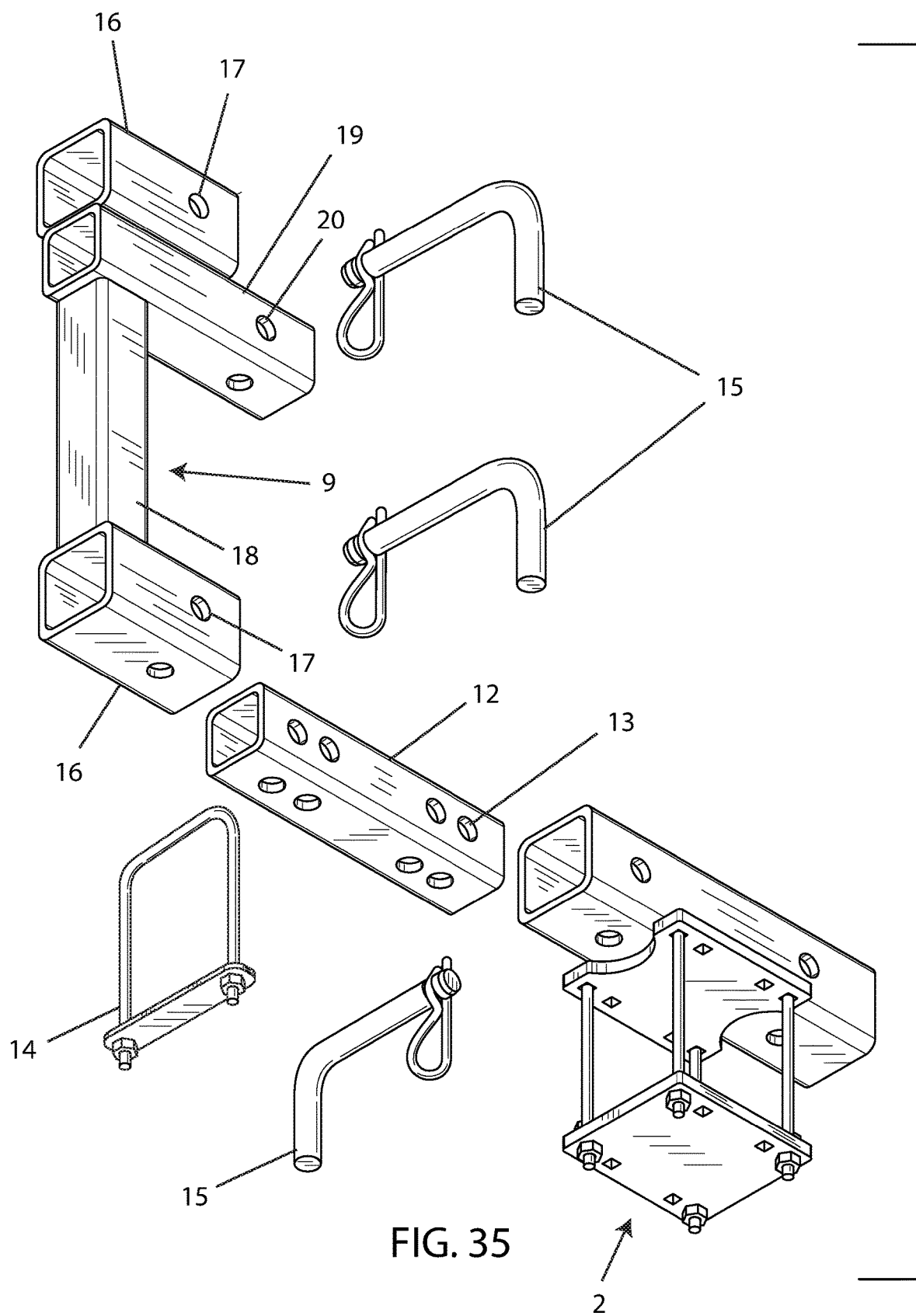
FIG. 35 is another perspective view of FIG. 34 thereof.
Figure 36:
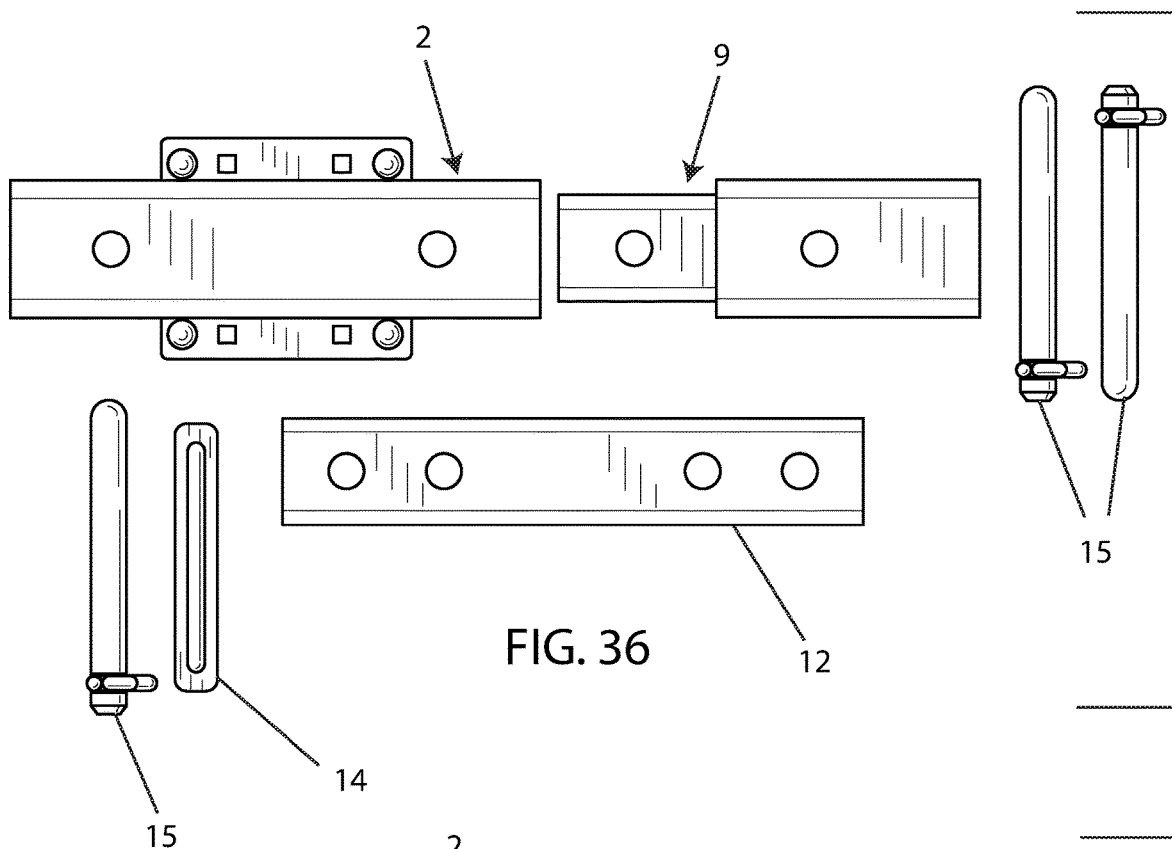
FIG. 36 is a top plan view of FIG. 34 thereof.
Figure 37:
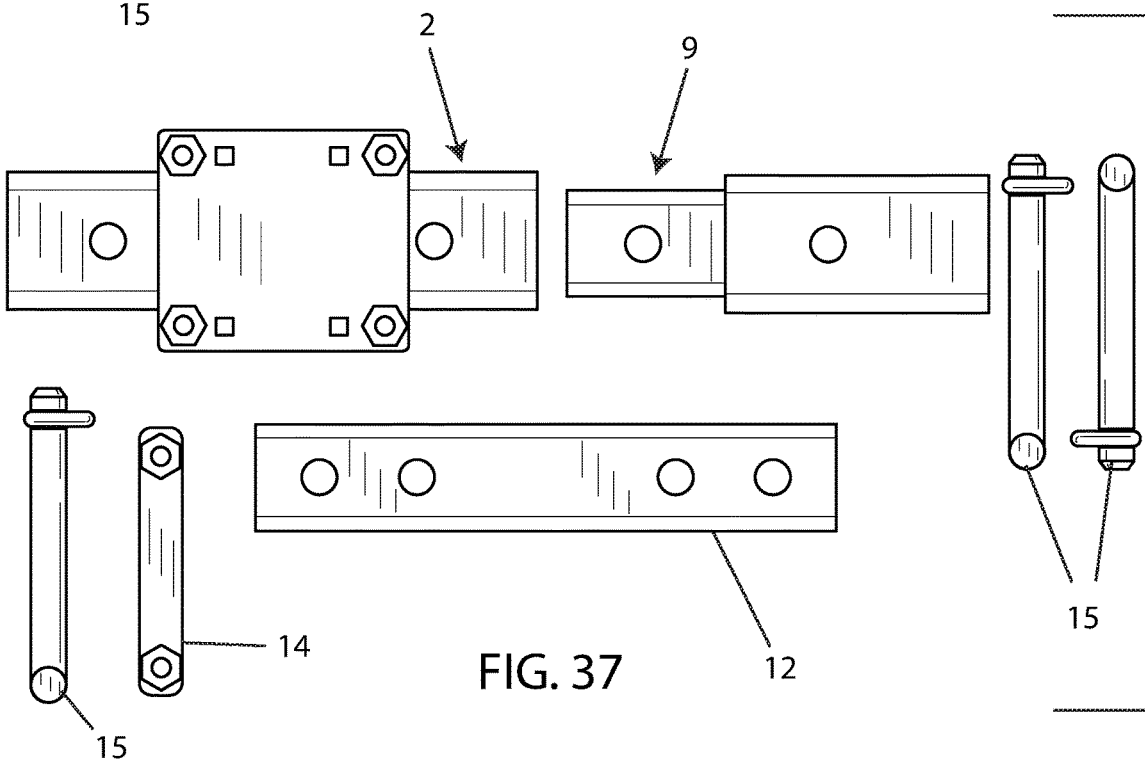
FIG. 37 is a bottom plan view of FIG. 34 thereof.
Figure 38:
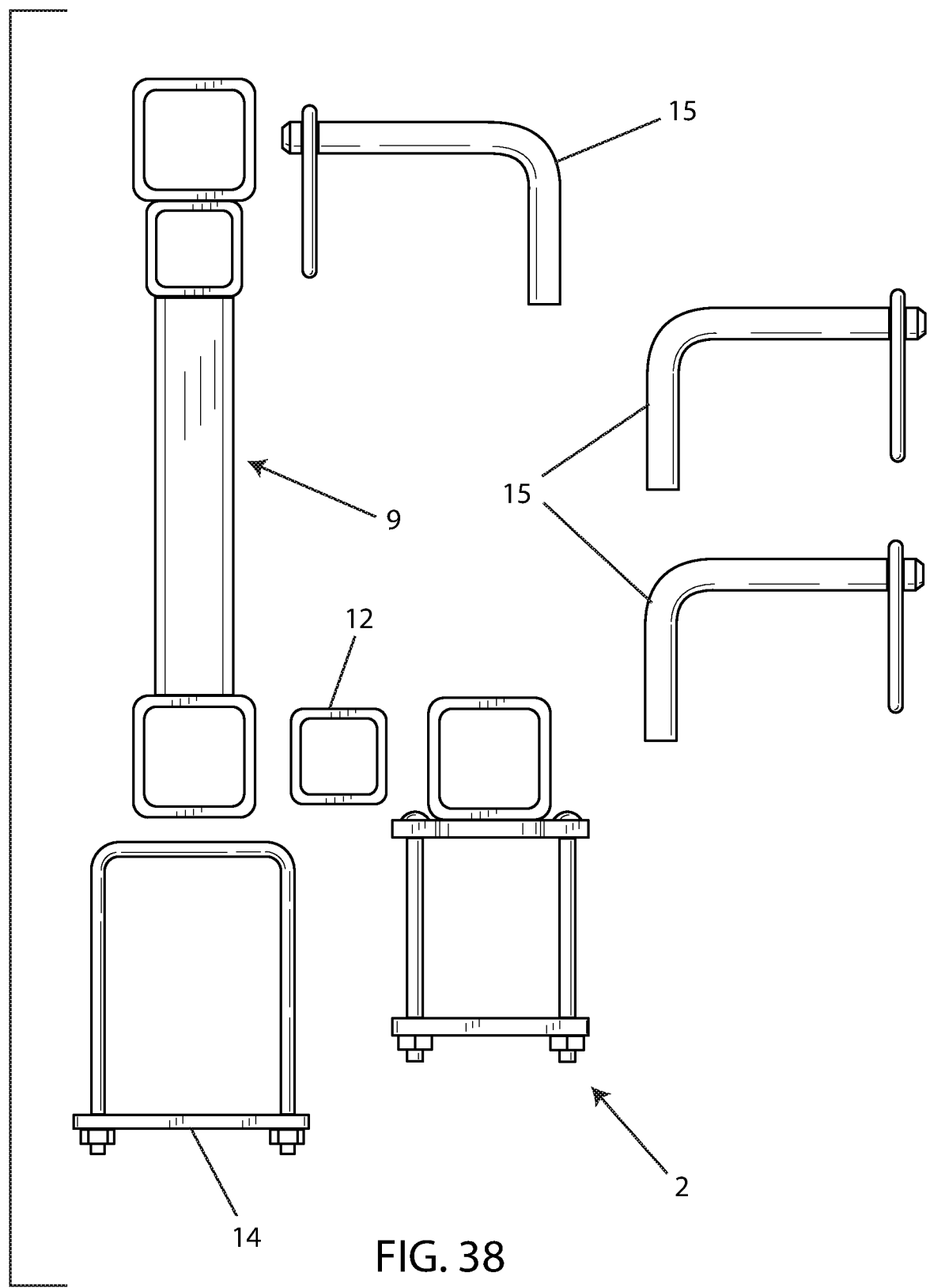
FIG. 38 is a front elevation view of FIG. 34 thereof.
Figure 39:
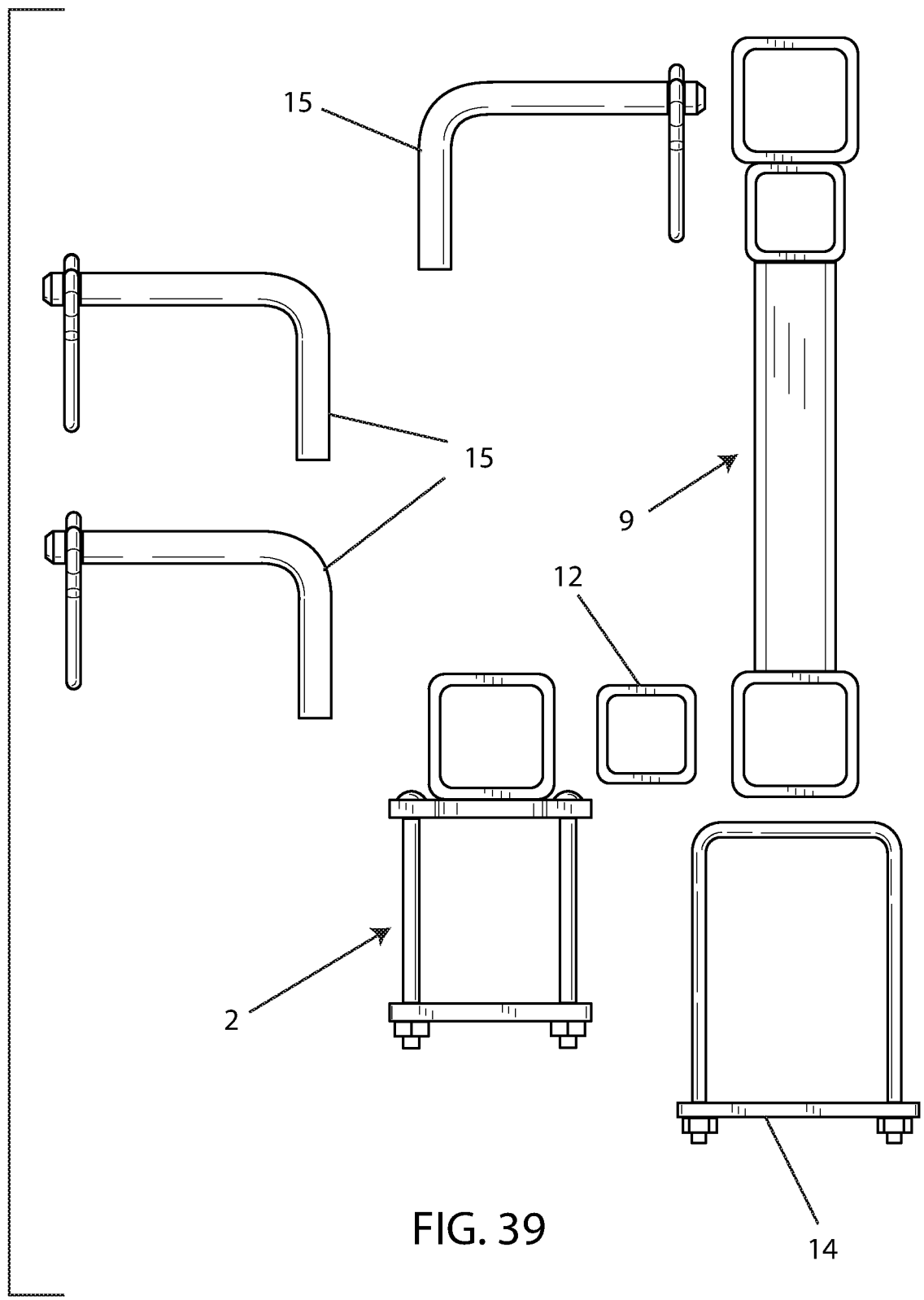
FIG. 39 is a rear elevation view of FIG. 34 thereof.
Figure 40:
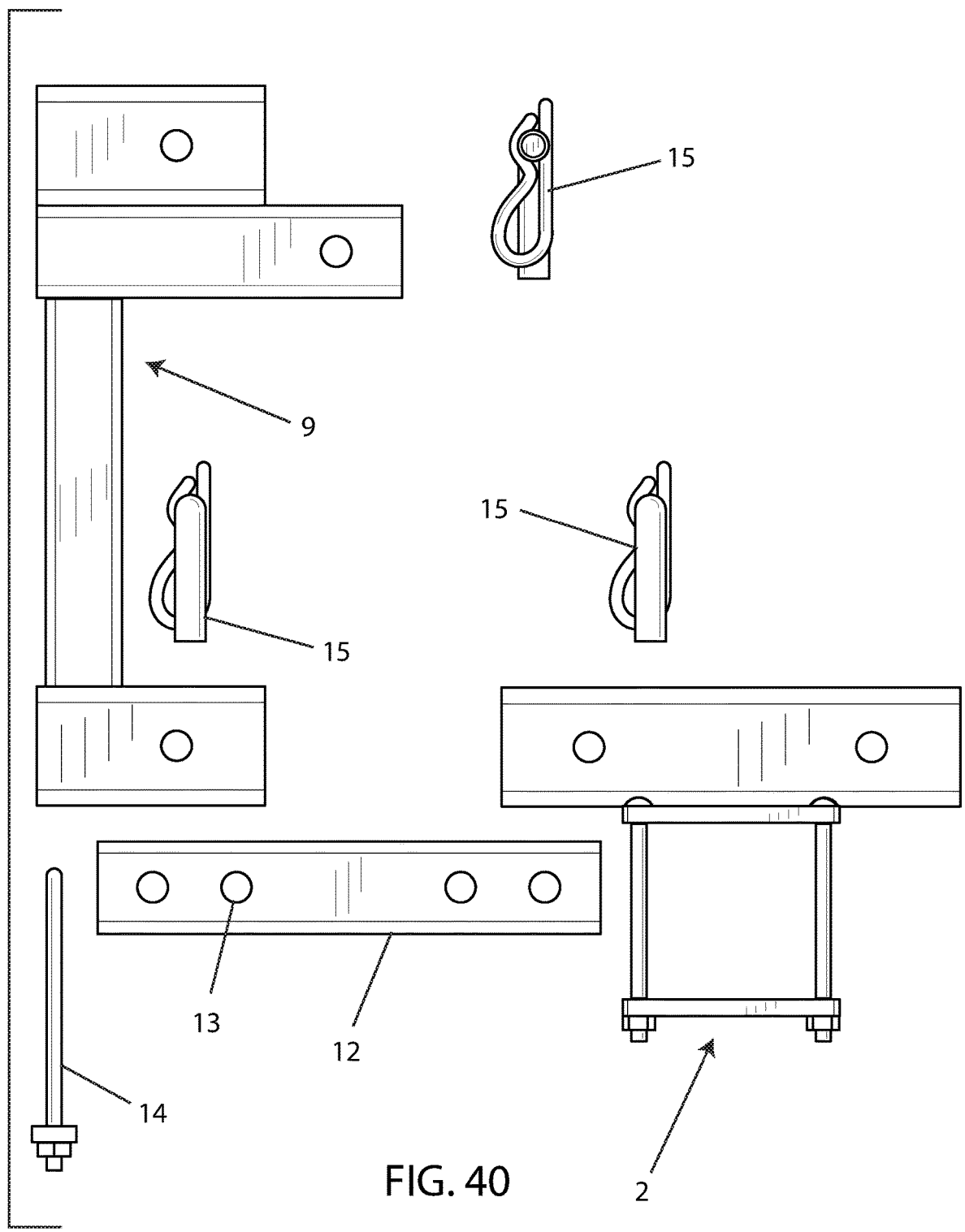
FIG. 40 is a left side elevation view of FIG. 34 thereof.
Figure 41:
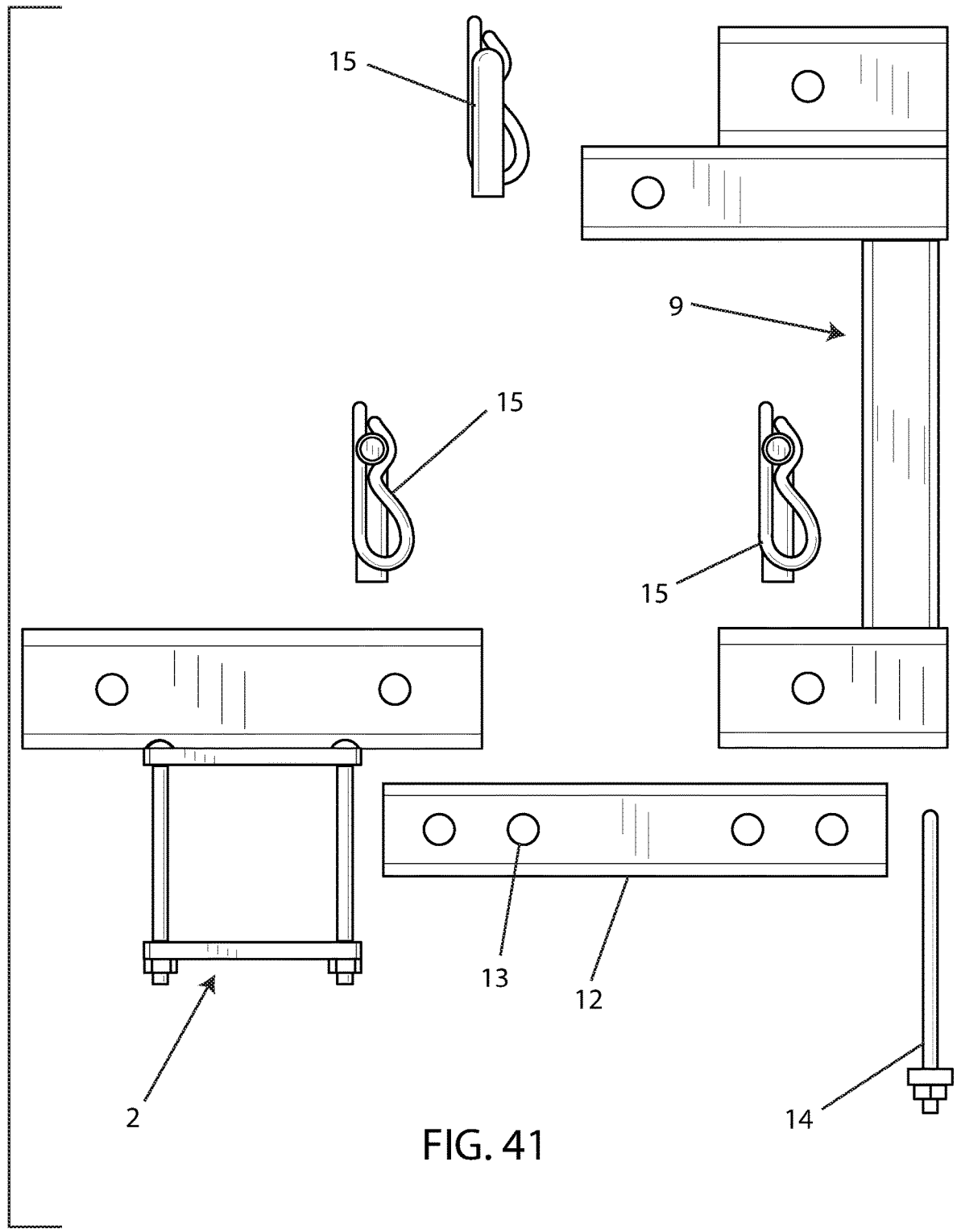
FIG. 41 is a right side elevation view of FIG. 34 thereof.

The riser 9 is one of the plurality of attachment members. The riser allows the user to change the height and/or horizontal orientation of the assembled attachment members or accessories. The riser may be coupled to the base tube of the mounting bracket 2 or to any other attachment member. As shown in FIG. 18, the riser 9 has a horizontal bottom (lower) mounting tube 16, a middle mounting tube 19 having at least a portion of a lateral side affixed to a top surface of the bottom mounting tube 16, a support member 18 upstanding from the middle mounting tube 19, and an upper mounting tube 16 that is parallel to the middle mounting tube 19 and to the bottom mounting tube 16.

The bottom mounting tube 16 defines a single hole 17 at each lateral side and at the bottom of the bottom mounting tube. The middle mounting tube 19 defines a single hole 20 at each lateral side and at the top of the middle mounting tube 19. The upper mounting tube 16 defines a single hole 17 at each lateral side and at the top of the upper mounting tube 16. The holes 17 and 20 can each receive a hitch pin therethrough when securing another attachment member, base tube, or accessory to it. At least one end of the bottom mounting tube defines an opening for coupling to another attachment member, base tube, or accessory. The upper mounting tube further defines opposing open ends, each open end for coupling to another attachment member, base tube, or accessory. The upper mounting tube is wider than the middle mounting tube and the bottom mounting tube. The upper mounting tube and the bottom mounting tube are each 2-inch receivers. The middle mounting tube 19 is longer than the upper mounting tube 16 and the bottom mounting tube 16. The middle mounting tube has an insertion member that may be inserted into the base tube or the receiving portion of any other attachment member or accessory.

The hand pole 23 is one of the plurality of attachment members. The hand pole 23 serves two functions with the hitch mount assembly 1. First, when the hand pole is arranged in an upstanding configuration as shown in the figures, the user may use the hand pole (or support rail) to aid in lifting himself or herself up to the frame. Second, when the hand pole is arranged parallel both to the ground and/or the base tube, the hand pole may be used as a handle to guide pushing or pulling a wheeled trailer (or frame). The hand pole 23 is essentially a handle 27, an upstanding pole member 28, an elbow brace 29, and a mounting tube 31 having an insertion member for coupling. The handle 27 is perpendicular to and affixed to the pole member 28. The pole member 28 extends from the elbow bracket 29. As shown in FIG. 18, the mounting tube 31 extends from and abuts an end of the elbow brace 29. The mounting tube 31 is perpendicular to the pole member 28 and parallel to the handle 27. The mounting tube defines a 5/16-inch hole therethrough for receiving a hitch pin 15. The elbow bracket 29 also defines a hole 30 therethrough for receiving a hitch pin 15.

The step 10 is one of the plurality of attachment members. Each step 10 is detachable from the hitch mount assembly 1. The steps may be arranged in a variety of configurations and heights, including adjacent, parallel, and staggered heights. With the hitch mount assembly, the user now has flexibility in arranging the step layout for easier access to structures like boats, trailers, or other equipment. Each step 10 has a platform and a mounting tube. Each platform 10 is elongated and provides a non-slip, flat surface with a non-skid chemical resistant heat diffusing surface. The platform also allows a person to stand on the platform with two feet. The platform size is preferably 8-inches wide by 18-inches long. In the embodiment shown in the figures, the platform 10 has a forward edge, rear edge, and two opposing side edges. Here, the forward edge contours to the side edges, eliminating corners to mitigate injury or damage to a person or property. The top surface of the platform defines a longitudinal indentation or groove to prevent rain, debris, or other liquid from pooling on the surface. The steps may further define perimeter apertures for tie-downs and/or eyelets for the attaching of license plates (not shown).

The step is affixed above and arranged perpendicular to a mounting tube. The mounting tube may be the base tube 3 of the mounting bracket 2 or another type of extender. As shown in the figures, particularly in FIGS. 18 and 19, one embodiment of the step shows the step 10 is affixed to the top of the base tube 3 of the mounting bracket 2. In another embodiment of the step 10 shown in at least FIGS. 18 and 19, the step is affixed above a mounting tube 21, with the mounting tube defining at least one open end and two opposing lateral sides, with each opposing lateral side defining three spaced apart holes 24 for selectively receiving a hitch pin therethrough. The spaced apart holes allow the user to position the step closer to or father away from the mounting tube to which it is coupled. Here, the mounting tube may be selectively inserted into the base tube of the mounting bracket, or to another extender, or to a riser.

The tire carrier (spare tire mount) (not shown) is one of the plurality of attachment members. The tire carrier has a mounting tube with an insertion member; an arm; a brace member; and at least one hitch pin. The tire carrier provides for easy mounting and removal of spare tires. The mounting tube may be selectively inserted into any attachment member receiving (mounting) tube or the base tube, or in any conventional hitch receiver. The tire carrier allows the user to store or transport a spare tire without using the vehicle or equipment's conventional options. An extender and/or a riser may also be used if additional spacing or height clearance is needed.

The mounting tube of the tire carrier defines an open end, and further defines at least two aligned holes. The mounting tube extends laterally on the same plane as the tire carrier. Extending downwardly at an acute angle is a tubular arm. The arm extends approximately forty-five degrees from an end of the mounting tube to the opposing end of the arm, which abuts and is affixed to the brace member. The arm defines an open end. This arm allows the tire carrier to extend outwardly away from the attachment. The arm has a length longer than the mounting tube.

The brace member of the tire carrier is preferably made from steel. The brace member is essentially a flat square plate welded onto a rectangular bracket. The brace member further defines four bores, each of which is arranged to match common spare tire bolt patterns. The outer side of the brace member removably abuts the spare tire. Lug nuts, or other fasteners, are drawn through the brace member bores to secure the spare tire to the brace member. The fasteners are preferably ⅝ in carriage bolts. A first rectangular bracket is welded onto a second rectangular bracket in an upward tilting position. The upward angle of the first bracket attachment extends the plate upwardly, positioning the plate away from the frame. The second rectangular bracket is welded to the first bracket attachment in a horizontal position that allows the tire mount to be attached to a trailer hitch.

The wheel mounting plate is one of the plurality of attachment members. The wheel mounting plate allows for easy mounting and removal of most trailer jacks (jack mounts) having a 4.375-inch×5.375-inch bolt pattern. The wheel mounting plate has a 2-inch mounting tube and a mounting plate. The mounting tube has four holes therethrough. The plate has four bores therethrough. Here, the wheel mounting plate can attach a jack mounting for changing a flat tire. Alternatively, the two independent wheel mounting plates, each with an attached trailer wheel, may installed on either side of the trailer tongue to allow a tandem axle trailer to be easily moved.

The present invention provides an innovative method of using a mounting bracket having with two mounting plates that can be quickly attached to any part of any frame without interfering with an existing trailer tongue. Multiple mounting brackets may be positioned onto different locations on the frame to allow the different embodiments described herein. In one embodiment, the invention is hitch mount assembly for removably mounting to a frame of a trailer, a watercraft trailer, a vehicle, or any mountable structure without using an existing hitch receiver of the trailer, the watercraft trailer, the vehicle, or the mountable structure, said hitch mount assembly comprising (including or having):

1. at least one mounting bracket comprising:
   a) at least one base tube having a seamless hollow interior, a first lateral side, a second lateral side, a top, and a bottom, with the at least one base tube further defining opposing open ends allowing for up to two independent couplings of a plurality of attachment members to or through each of the opposing open ends of the at least one base tube, and with the at least base tube further defining two spaced apart holes on the first lateral side and two spaced apart holes on the second lateral side, wherein each of the two spaced apart holes on the first lateral side being aligned with each of the two spaced apart holes on the second lateral side;
   b) a first mounting plate and a second mounting plate, with each of the mounting plates having a top and a bottom, with the bottom of the at least one base tube being affixed to the top of the first mounting plate, and with the first mounting plate and the second mounting plate each defining a plurality of spaced apart bores, each of the plurality of bores of the first mounting plate being aligned with each of the plurality of bores of the second mounting plate, wherein the first mounting plate and the second mounting plate are each removably positioned about the frame parallel to each other; and
   c) a plurality of fasteners, with the plurality of fasteners being drawn through four of the plurality of bores of the first mounting plate and the second mounting plate to sandwich and fasten the two mounting plates to the frame;
2. a plurality of hitch pins;
3. a selective arrangement of the plurality of attachment members, each of the plurality of attachment members defining at least one hole;
4. wherein each of the plurality of hitch pins being removably drawn through one of any of the plurality of holes in the at least one base tube and the at least one hole of any of the plurality of attachment members during selective coupling; wherein the seamless hollow interior of the at least one base tube adapted to selectively and slidably couple with at least one of the plurality of attachment members for a snug, slip fit; wherein the at least one base tube being selectively adapted for use with the frame in an orientation parallel, vertical, or perpendicular to the frame, for independently coupling to one or more of the plurality of attachment members; and wherein the orientation of each of the plurality of attachment members may be selectively arranged and configured during coupling.

In another embodiment, the invention is a hitch mount assembly for removably mounting to a frame of a trailer, a watercraft trailer, or any mountable structure without using an existing hitch receiver of the trailer, the watercraft trailer, or any mountable structure, the hitch mount assembly forming a boat stair kit comprising (including or having):

1. at least one mounting bracket comprising:
   a. at least one base tube having a seamless hollow interior, a first lateral side, a second lateral side, a top, and a bottom, with the at least one base tube defining opposing open ends allowing for up to two independent couplings of a plurality of attachment members to or through each of the opposing open ends of the at least one base tube, with the at least one base tube further defining two spaced apart holes on the first lateral side, two spaced apart holes on the second lateral side, two spaced apart holes on the top, and two spaced apart holes on the bottom, wherein each of the two spaced apart holes on the first lateral side being aligned with each of the two spaced apart holes on the second lateral side, and wherein each of the two spaced apart holes on the top being aligned with each of the two spaced apart holes on the bottom of the at least one base tube;
   b. a first mounting plate and a second mounting plate, with each of the mounting plates having a top and a bottom, with the bottom of the at least one base tube being affixed to the top of the first mounting plate, and with the first mounting plate and the second mounting plate each defining two rows of a plurality of spaced apart bores, each of the plurality of bores of the first mounting plate being aligned with each of the plurality of bores of the second mounting plate wherein the first mounting plate and the second mounting plate are each removably positioned about the frame parallel to each other; and
   c. a plurality of fasteners, with the plurality of fasteners being drawn through four of the plurality of bores of the first mounting plate and the second mounting plate to sandwich the two mounting plates to the frame;

2. a plurality of hitch pins;

3. a first step affixed to the top of the at least one base tube of the mounting bracket;

4. at least a second step having a platform and a mounting tube, the mounting tube defining at least one open end and two opposing lateral sides, with each opposing lateral side defining three spaced apart holes for selectively receiving one of the plurality of hitch pins therethrough when positioning the at least second step during coupling;

5. a hand pole having a handle, an upstanding pole member, an elbow brace, and a mounting tube having an insertion member for coupling, with the mounting tube defining at least one hole for receiving one of the plurality of hitch pins, wherein the hand pole may be selectively arranged in an upstanding configuration for use as a support rail or in a parallel configuration to the at least one base tube for use as a guide in pushing or pulling the frame;

6. a riser having a bottom mounting tube having a top, a bottom, and two lateral sides, with the bottom mounting tube defining a single hole at each lateral side and at the bottom of the bottom mounting tube and defining at least one open end for coupling; a middle mounting tube having a top, a bottom, and two lateral sides, with the middle mounting tube having at least a portion of a lateral side affixed to the top of the bottom mounting tube, with the middle mounting tube defining a single hole at each lateral side and at the top of the middle mounting tube and defining at least one open end for coupling; a support member upstanding from the middle mounting tube; and an upper mounting tube having a top, a bottom, and two lateral sides, with the upper mounting tube being parallel to the middle mounting tube and to the bottom mounting tube, with the upper mounting tube defining a single hole at each lateral side and at the top of the upper mounting tube and defining opposing open ends each for coupling;

7. at least one of a plurality of extenders for extending the coupled length of the first step, the at least second step, or the riser, with each of the plurality of extenders defining at least one hole;

8. wherein each of the plurality of hitch pins being removably drawn through one of the at least one hole of the plurality of extenders, any of the holes defined in the riser, the hole defined in the at least second step mounting tube, and any of the plurality of holes defined in the at least one base tube during selective coupling of the plurality of extenders, the riser, the at least second step mounting tube, and the last least one base tube; wherein the seamless hollow interior of the at least one base tube adapted to selectively and slidably couple with at least one of the first step, the at least second step, the hand pole, at least one of the plurality of extenders, or the riser for a snug, slip fit; wherein the at least one base tube being selectively adapted for use with the frame in an orientation parallel, vertical, or perpendicular to the frame, with each of the opposing open ends of the at least one base tube capable of independently coupling to the first step, the at least second step, the hand pole, at least one of the plurality of extenders, or the riser; and wherein orientation of each of the riser, the at least second step, and the plurality of extenders may be selectively arranged and configured during coupling.

In another embodiment, the invention is a hitch mount assembly for removably mounting to a frame of a trailer, a watercraft trailer, or any mountable structure without using an existing hitch receiver of the trailer, the watercraft trailer, or any mountable structure, the hitch mount assembly forming a watercraft trailer kit comprising (including or having):

1. at least one mounting bracket comprising:

a) at least one base tube having a seamless hollow interior, a first lateral side, a second lateral side, a top, and a bottom, with the at least one base tube further defining opposing open ends, two spaced apart holes on the first lateral side, two spaced apart holes on the second lateral side, two spaced apart holes on the top, and two spaced apart holes on the bottom, wherein each of the two spaced apart holes on the first lateral side being aligned with each of the two spaced apart holes on the second lateral side, and wherein each of the two spaced apart holes on the top being aligned with each of the two spaced apart holes on the bottom of the at least one base tube;

b) a first mounting plate and a second mounting plate, with each of the mounting plates having a top and a bottom, with the bottom of the at least one base tube being affixed to the top of the first mounting plate, and with the first mounting plate and the second mounting plate each defining two rows of a plurality of spaced apart bores, each of the plurality of bores of the first mounting plate being aligned with each of the plurality of bores of the second mounting plate wherein the first mounting plate and the second mounting plate are each removably positioned about the frame parallel to each other; and c) a plurality of fasteners, with the plurality of fasteners being drawn through four of the plurality of bores of the first mounting plate and the second mounting plate to sandwich and fasten the two mounting plates to the frame;

2. a plurality of hitch pins;

3. a riser having a bottom mounting tube having a top, a bottom, and two lateral sides, with the bottom mounting tube defining a single hole at each lateral side and at the bottom of the bottom mounting tube and defining at least one open end for coupling; a middle mounting tube having a top, a bottom, and two lateral sides, with the middle mounting tube having at least a portion of a lateral side affixed to the top of the bottom mounting tube, with the middle mounting tube defining a single hole at each lateral side and at the top of the middle mounting tube and defining at least one open end for coupling; a support member upstanding from the middle mounting tube; and an upper mounting tube having a top, a bottom, and two lateral sides, with the upper mounting tube being parallel to the middle mounting tube and to the bottom mounting tube, with the upper mounting tube defining a single hole at each lateral side and at the top of the upper mounting tube and defining opposing open ends each for coupling;

4. at least one extender for extending the coupled length of the at least one base tube and the riser, with extender having two lateral sides each lateral side defining at least two spaced apart holes;

5. wherein each of the plurality of hitch pins being removably drawn through one of the at least two spaced apart holes of the at least one extender, any of the holes defined in the riser, and any of the plurality of holes defined in the at least one base tube during selective coupling of the at least one extender, the riser, and the at least one base tube; wherein the seamless hollow interior of the at least one base tube adapted to selectively and slidably couple with one of the at least one extender or the riser for a snug, slip fit; wherein the at least one base tube being selectively adapted for use with the frame in an orientation parallel, vertical, or perpendicular to the frame, with each of the opposing open ends of the at least one base tube being capable of independently coupling to at least one of the at least one extender or the riser; and wherein the orientation of each of the riser and the at least one extender may be selectively arranged and configured during coupling.

Those skilled in the art who have the benefit of this disclosure will appreciate that it may be used as the creative basis for designing devices or methods similar to those disclosed herein, or to design improvements to the invention disclosed herein; such new or improved creations should be recognized as dependent upon the invention disclosed herein, to the extent of such reliance upon this disclosure.

I claim:

1. A hitch mount assembly for removably mounting to a frame of a trailer, a watercraft trailer, a vehicle, or any mountable structure without using an existing hitch receiver of the trailer, the watercraft trailer, the vehicle, or the mountable structure, said hitch mount assembly comprising:
   a) at least one mounting bracket comprising:
      i) at least one base tube having a seamless hollow interior, a first lateral side, a second lateral side, a top, and a bottom, with the at least one base tube further defining opposing open ends allowing for up to two independent couplings of a plurality of attachment members to or through each of the opposing open ends of the at least one base tube, with the at least base tube further defining two spaced apart holes on the first lateral side and two spaced apart holes on the second lateral side, wherein each of the two spaced apart holes on the first lateral side being aligned with each of the two spaced apart holes on the second lateral side, and with the at least one base tube of the mounting bracket further defining two spaced apart holes on the top of the at least one base tube and two spaced apart holes on the bottom of the at least one base tube, wherein each of the two spaced apart holes on the top of the at least one base tube being aligned with each of the two spaced apart holes on the bottom of the at least one base tube;
      ii) a first mounting plate and a second mounting plate, with each of the mounting plates having a top and a bottom, with the bottom of the at least one base tube being affixed to the top of the first mounting plate, with the first mounting plate and the second mounting plate each defining a plurality of spaced apart bores, each of the plurality of bores of the first mounting plate being aligned with each of the plurality of bores of the second mounting plate, wherein the first mounting plate and the second mounting plate are each removably positioned about the frame parallel to each other, and with the first mounting plate of the mounting bracket further comprising a contoured edge on a forward section and rear section of the first mounting plate to accommodate receiving the at least one of the plurality of hitch pins through at least one of the two spaced apart holes on the top of the at least one base tube and the bottom of the at least one base tube; and
      iii) a plurality of fasteners, with the plurality of fasteners being drawn through four of the plurality of bores of the first mounting plate and the second mounting plate to sandwich and fasten the two mounting plates to the frame;
   b) a plurality of hitch pins;
   c) a selective arrangement of the plurality of attachment members, each of the plurality of attachment members defining at least one hole;
   d) wherein each of the plurality of hitch pins being removably drawn through one of any of the plurality of holes in the at least one base tube and the at least one hole of any of the plurality of attachment members during selective coupling;
   e) wherein the seamless hollow interior of the at least one base tube adapted to selectively and slidably couple with at least one of the plurality of attachment members for a snug, slip fit;
   f) wherein the at least one base tube being selectively adapted for use with the frame in an orientation parallel, vertical, or perpendicular to the frame, for independently coupling to one or more of the plurality of attachment members; and
   g) wherein the orientation of each of the plurality of attachment members may be selectively arranged and configured during coupling.

2. The hitch mount assembly of claim 1, the plurality of bores defined in each of the first mounting plate and the second mounting plate further defining two rows of the plurality of bores, with each row of the plurality of bores having four spaced apart bores for eight bores per mounting plate.

3. The hitch mount assembly of claim 1, the mounting bracket further comprising a second base tube having the same structure and configuration as the at least one base tube, with the second base tube being affixed to the second mounting plate to allow for up to four independent couplings of the plurality of attachment members, with one of the plurality of attachment members being coupled to or through each open end of the at least one base tube and of the second base tube, then being secured with one of the plurality of hitch pins.

4. The hitch mount assembly of claim 3, first mounting plate of the mounting bracket further having a contoured edge on a forward section and rear section of the first mounting plate to accommodate selectively receiving one of the plurality of hitch pins through each of the two spaced apart holes on the top of the at least one base tube and the bottom of the at least one base tube; and the second mounting plate of the mounting bracket further having a contoured edge on a forward section and rear section of the second mounting plate to accommodate selectively receiving at least one of the plurality of hitch pins through at least one of the two spaced apart holes on the top of the second base tube and the bottom of the second base tube.

5. The hitch mount assembly of claim 1, the plurality of attachment members being selected from the group comprising an extender, a riser, a hand pole, a step, a tire carrier, and a jack mount, with a selective combination of one or more of the plurality of attachment members coupled to the at least one base tube of the mounting bracket forming a kit.

6. The hitch mount assembly of claim 5, hitch assembly comprising a kit further comprising at least: the mounting bracket, the plurality of hitch pins, at least one step, a riser, at least one of a plurality of extenders, and a hand pole.

7. The hitch mount assembly of claim 5, the hitch assembly comprising a kit further comprising at least: the mounting bracket, the plurality of hitch pins, at least one extender, a U-bolt pin, and a riser.

8. A hitch mount assembly for removably mounting to a frame of a trailer, a watercraft trailer, a vehicle, or any mountable structure without using an existing hitch receiver of the trailer, the watercraft trailer, the vehicle or the mountable structure, said hitch mount assembly forming a boat stair kit comprising:
   a) at least one mounting bracket comprising:
      i) at least one base tube having a seamless hollow interior, a first lateral side, a second lateral side, a top, and a bottom, with the at least one base tube defining opposing open ends allowing for up to two independent couplings of a plurality of attachment members to or through each of the opposing open ends of the at least one base tube, with the at least one base tube further defining two spaced apart holes on the first lateral side, two spaced apart holes on the second lateral side, two spaced apart holes on the top, and two spaced apart holes on the bottom, wherein each of the two spaced apart holes on the first lateral side being aligned with each of the two spaced apart holes on the second lateral side, and wherein each of the two spaced apart holes on the top being aligned with each of the two spaced apart holes on the bottom of the at least one base tube;
ii) a first mounting plate and a second mounting plate, with each of the mounting plates having a top and a bottom, with the bottom of the at least one base tube being affixed to the top of the first mounting plate, and with the first mounting plate and the second mounting plate each defining two rows of a plurality of spaced apart bores, each of the plurality of bores of the first mounting plate being aligned with each of the plurality of bores of the second mounting plate wherein the first mounting plate and the second mounting plate are each removably positioned about the frame parallel to each other; and
iii) a plurality of fasteners, with the plurality of fasteners being drawn through four of the plurality of bores of the first mounting plate and the second mounting plate to sandwich the two mounting plates to the frame;

b) a plurality of hitch pins;
c) a first step affixed to the top of the at least one base tube of the mounting bracket;
d) at least a second step having a platform and a mounting tube, the mounting tube defining at least one open end and two opposing lateral sides, with each opposing lateral side defining three spaced apart holes for selectively receiving one of the plurality of hitch pins therethrough when positioning the at least second step during coupling;
e) a hand pole having a handle, an upstanding pole member, an elbow brace, and a mounting tube having an insertion member for coupling, with the mounting tube defining at least one hole for receiving one of the plurality of hitch pins, wherein the hand pole may be selectively arranged in an upstanding configuration for use as a support rail or in a parallel configuration to the at least one base tube for use as a guide in pushing or pulling the frame;
f) a riser having a bottom mounting tube having a top, a bottom, and two lateral sides, with the bottom mounting tube defining a single hole at each lateral side and at the bottom of the bottom mounting tube and defining at least one open end for coupling; a middle mounting tube having a top, a bottom, and two lateral sides, with the middle mounting tube having at least a portion of a lateral side affixed to the top of the bottom mounting tube, with the middle mounting tube defining a single hole at each lateral side and at the top of the middle mounting tube and defining at least one open end for coupling; a support member upstanding from the middle mounting tube; and an upper mounting tube having a top, a bottom, and two lateral sides, with the upper mounting tube being parallel to the middle mounting tube and to the bottom mounting tube, with the upper mounting tube defining a single hole at each lateral side and at the top of the upper mounting tube and defining opposing open ends each for coupling;
g) at least one of a plurality of extenders for extending the coupled length of the first step, the at least second step, or the riser, with each of the plurality of extenders defining at least one hole;
h) wherein each of the plurality of hitch pins being removably drawn through one of the at least one hole of the plurality of extenders, any of the holes defined in the riser, the hole defined in the at least second step mounting tube, and any of the plurality of holes defined in the at least one base tube during selective coupling of the plurality of extenders, the riser, the at least second step mounting tube, and the last least one base tube;
i) wherein the seamless hollow interior of the at least one base tube adapted to selectively and slidably couple with at least one of the first step, the at least second step, the hand pole, at least one of the plurality of extenders, or the riser for a snug, slip fit;
j) wherein the at least one base tube being selectively adapted for use with the frame in an orientation parallel, vertical, or perpendicular to the frame, with each of the opposing open ends of the at least one base tube capable of independently coupling to the first step, the at least second step, the hand pole, at least one of the plurality of extenders, or the riser; and
k) wherein orientation of each of the riser, the at least second step, and the plurality of extenders may be selectively arranged and configured during coupling.

9. The hitch mount assembly of claim 8, the plurality of bores defined in each of the first mounting plate and the second mounting plate further defining two rows of the plurality of bores, with each row of the plurality of bores having four spaced apart bores for eight bores per mounting plate.

10. The hitch mount assembly of claim 9, the first mounting plate of the mounting bracket further comprising a contoured edge on a forward section and rear section of the first mounting plate to accommodate receiving at least one of the plurality of hitch pins through at least one of the two spaced apart holes on the top of the at least one base tube and the bottom of the at least one base tube.

11. The hitch mount assembly of claim 9, the mounting bracket further comprising a second base tube having the same structure and configuration as the at least one base tube, with the second base tube being affixed to the second mounting plate to allow for up to four independent couplings of the plurality of attachment members, with one of the plurality of attachment members being coupled to or through each open end of the at least one base tube and the second base tube, then being secured with one of the plurality of hitch pins.

12. The hitch mount assembly of claim 11, the first mounting plate of the mounting bracket further comprising a contoured edge on a forward section and rear section of the first mounting plate to accommodate selectively receiving one of the plurality of hitch pins through each of the two spaced apart holes on the top and bottom of the at least one base tube; and the second mounting plate of the mounting bracket further comprising a contoured edge on a forward section and rear section of the second mounting plate to accommodate selectively receiving one of the plurality of hitch pins through at least one of the two spaced apart holes on the top of the second base tube and the bottom of the second base tube.

13. A hitch mount assembly for removably mounting to a frame of a trailer, a watercraft trailer, a vehicle, or any mountable structure without using an existing hitch receiver of the trailer, the watercraft trailer, the vehicle or the mountable structure, said hitch mount assembly forming a watercraft trailer kit comprising:
- a) at least one mounting bracket comprising:
  - i) at least one base tube having a seamless hollow interior, a first lateral side, a second lateral side, a top, and a bottom, with the at least one base tube further defining opposing open ends, two spaced apart holes on the first lateral side, two spaced apart holes on the second lateral side, two spaced apart holes on the top, and two spaced apart holes on the bottom, wherein each of the two spaced apart holes on the first lateral side being aligned with each of the two spaced apart holes on the second lateral side, and wherein each of the two spaced apart holes on the top being aligned with each of the two spaced apart holes on the bottom of the at least one base tube;
  - ii) a first mounting plate and a second mounting plate, with each of the mounting plates having a top and a bottom, with the bottom of the at least one base tube being affixed to the top of the first mounting plate, and with the first mounting plate and the second mounting plate each defining two rows of a plurality of spaced apart bores, each of the plurality of bores of the first mounting plate being aligned with each of the plurality of bores of the second mounting plate wherein the first mounting plate and the second mounting plate are each removably positioned about the frame parallel to each other; and
  - iii) a plurality of fasteners, with the plurality of fasteners being drawn through four of the plurality of bores of the first mounting plate and the second mounting plate to sandwich and fasten the two mounting plates to the frame;
- b) a plurality of hitch pins;
- c) a riser having a bottom mounting tube having a top, a bottom, and two lateral sides, with the bottom mounting tube defining a single hole at each lateral side and at the bottom of the bottom mounting tube and defining at least one open end for coupling; a middle mounting tube having a top, a bottom, and two lateral sides, with the middle mounting tube having at least a portion of a lateral side affixed to the top of the bottom mounting tube, with the middle mounting tube defining a single hole at each lateral side and at the top of the middle mounting tube and defining at least one open end for coupling; a support member upstanding from the middle mounting tube; and an upper mounting tube having a top, a bottom, and two lateral sides, with the upper mounting tube being parallel to the middle mounting tube and to the bottom mounting tube, with the upper mounting tube defining a single hole at each lateral side and at the top of the upper mounting tube and defining opposing open ends each for coupling;
- d) at least one extender for extending the coupled length of the at least one base tube and the riser, with extender having two lateral sides each lateral side defining at least two spaced apart holes;
- e) wherein each of the plurality of hitch pins being removably drawn through one of the at least two spaced apart holes of the at least one extender, any of the holes defined in the riser, and any of the plurality of holes defined in the at least one base tube during selective coupling of the at least one extender, the riser, and the at least one base tube;
- f) wherein the seamless hollow interior of the at least one base tube adapted to selectively and slidably couple with one of the at least one extender or the riser for a snug, slip fit;
- g) wherein the at least one base tube being selectively adapted for use with the frame in an orientation parallel, vertical, or perpendicular to the frame, with each of the opposing open ends of the at least one base tube being capable of independently coupling to at least one of the at least one extender or the riser; and
- h) wherein the orientation of each of the riser and the at least one extender may be selectively arranged and configured during coupling.

14. The hitch mount assembly of claim 13, the plurality of bores defined in each of the first mounting plate and the second mounting plate further defining two rows of the plurality of bores, with each row of the plurality of bores having four spaced apart bores for eight bores per mounting plate.

15. The hitch mount assembly of claim 14, the mounting bracket further comprising a second base tube having the same structure and configuration as the at least one base tube, with the second base tube being affixed to the second mounting plate to allow for up to four independent couplings of the riser, the at least one extender, or a plurality of attachment members being coupled to or through each open end of the at least one base tube and of the second base tube, then being secured with one of the plurality of hitch pins.

16. The hitch mount assembly of claim 15, the first mounting plate of the mounting bracket further comprising a contoured edge on a forward section and rear section of the first mounting plate to accommodate selectively receiving at least one of the plurality of hitch pins through at least one of the two spaced apart holes on the top and bottom of the at least one base tube; and the second mounting plate of the mounting bracket further comprising a contoured edge on a forward section and rear section of the second mounting plate to accommodate selectively receiving at least one of the plurality of hitch pins through at least one of the two spaced apart holes on the top of the second base tube and the bottom of the second base tube.

17. The hitch mount assembly of claim 13, the first mounting plate of the mounting bracket further comprising a contoured edge on a forward section and rear section of the first mounting plate to accommodate receiving at least one of the plurality of hitch pins through at least one of the two spaced apart holes on the top of the at least one base tube and the bottom of the at least one base tube.

18. The hitch mount assembly of claim 13, the hitch mount assembly further comprising a U-bolt.

* * * * *